United States Patent
Koch

(10) Patent No.: US 10,138,917 B2
(45) Date of Patent: Nov. 27, 2018

(54) CONNECTOR SYSTEM FOR RAPID ASSEMBLY AND DISASSEMBLY OF PANELS AND OTHER MEMBERS

(71) Applicant: Jon Russell Koch, Thomasville, NC (US)

(72) Inventor: Jon Russell Koch, Thomasville, NC (US)

(*) Notice: Subject to any disclaimer, the term of this patent is extended or adjusted under 35 U.S.C. 154(b) by 81 days.

(21) Appl. No.: 14/720,769

(22) Filed: May 23, 2015

(65) Prior Publication Data
US 2015/0354612 A1 Dec. 10, 2015

Related U.S. Application Data

(60) Provisional application No. 62/002,199, filed on May 23, 2014.

(51) Int. Cl.
| | |
|---|---|
| *F16B 5/00* | (2006.01) |
| *F16B 5/01* | (2006.01) |
| *F16B 5/06* | (2006.01) |
| *F16B 12/22* | (2006.01) |
| *F16B 12/34* | (2006.01) |

(52) U.S. Cl.
CPC .............. *F16B 5/0052* (2013.01); *F16B 5/01* (2013.01); *F16B 5/0614* (2013.01); *F16B 12/22* (2013.01); *F16B 12/34* (2013.01); *Y10T 403/7075* (2015.01)

(58) Field of Classification Search
CPC ........ F16B 5/0052; F16B 5/01; F16B 5/0614; F16B 12/22; F16B 12/34; Y10T 403/7075
See application file for complete search history.

(56) References Cited

U.S. PATENT DOCUMENTS

| | | | | |
|---|---|---|---|---|
| 408,278 | A * | 8/1889 | White ................ | A47B 47/04 312/264 |
| 733,500 | A * | 7/1903 | Moore ............... | F16B 5/02 403/376 |
| 1,181,934 | A * | 5/1916 | Smith ................ | E04B 1/6116 403/381 |
| 2,793,407 | A * | 5/1957 | Johnston ........... | F16B 12/20 403/182 |
| 3,037,593 | A * | 6/1962 | Webster ............ | E04B 2/7425 160/135 |
| 3,498,685 | A * | 3/1970 | Poplinski ........... | B23Q 1/26 384/40 |

(Continued)

*Primary Examiner* — James M Ference

(57) ABSTRACT

A connector system for joining panels or other components together includes male connectors and female connector recessed profiles. The male connectors are attachable to one panel or component and the female connector profiles can be formed in or attached to another panel or component. The male connector has a tapered body with dovetail side edges extending between a narrower leading end and a wider trailing end. The female connector profile has a footprint with a wider open entry section and a narrower closed anchoring section. Dovetail side walls extend between the entry and anchoring sections. The connectors are small, and multiple male and female connectors are used on joining panels. The connector system can be used in ready to assemble furniture, stud walls and other assemblies and are especially suited for use in wood based members of composite construction.

17 Claims, 27 Drawing Sheets

(56) References Cited

U.S. PATENT DOCUMENTS

| | | | | |
|---|---|---|---|---|
| 3,589,755 A | * | 6/1971 | King | E04B 1/6141 403/331 |
| 3,685,866 A | * | 8/1972 | Patenaude | E04B 1/2403 403/189 |
| 3,704,911 A | * | 12/1972 | Milakovich | A47C 4/02 297/411.28 |
| 3,774,966 A | * | 11/1973 | Faulkner | A47C 4/028 297/218.3 |
| 4,019,298 A | * | 4/1977 | Johnson, IV | E04B 1/185 403/175 |
| 4,025,216 A | * | 5/1977 | Hives | F16B 12/26 108/158.12 |
| 4,178,047 A | * | 12/1979 | Welch | F16B 12/22 108/60 |
| 4,199,907 A | * | 4/1980 | Bains | B66B 11/0253 403/231 |
| 4,251,969 A | * | 2/1981 | Bains | B66B 11/0253 52/584.1 |
| 4,258,464 A | * | 3/1981 | Ullman, Jr. | A47B 57/22 144/220 |
| 4,266,386 A | * | 5/1981 | Bains | E04B 1/6116 52/481.2 |
| 4,300,271 A | * | 11/1981 | Wohlhaupter | B23Q 1/28 384/59 |
| 4,363,201 A | * | 12/1982 | Bains | B66B 11/0253 52/584.1 |
| 4,439,971 A | * | 4/1984 | Rutherford | F16B 12/2027 292/194 |
| 4,573,513 A | * | 3/1986 | Small | A47G 5/00 160/135 |
| 4,587,788 A | * | 5/1986 | Bielicki | E04B 1/6137 256/59 |
| 4,646,497 A | * | 3/1987 | Hoenle | E04B 1/6137 403/334 |
| 4,684,285 A | * | 8/1987 | Cable | B64G 9/00 403/316 |
| 4,867,598 A | * | 9/1989 | Winter, IV | E04B 2/08 403/331 |
| 5,026,016 A | * | 6/1991 | Lisowski | F16B 21/09 248/225.11 |
| 5,244,300 A | * | 9/1993 | Perreira | E04B 1/2403 403/263 |
| 5,344,300 A | * | 9/1994 | Shapcott | B29C 31/048 141/183 |
| 5,347,693 A | * | 9/1994 | Otrusina | A45F 5/02 24/3.12 |
| 5,403,109 A | * | 4/1995 | Johnson | F16B 12/2036 403/231 |
| 5,433,416 A | * | 7/1995 | Johnson | B65D 23/003 248/475.1 |
| 5,544,938 A | * | 8/1996 | Saul | A47C 15/002 297/248 |
| 5,551,795 A | * | 9/1996 | Engibarov | B23Q 1/28 269/73 |
| 5,611,639 A | * | 3/1997 | Levenberg | F16B 12/20 403/319 |
| 5,630,644 A | * | 5/1997 | LaPointe | A47C 13/005 297/113 |
| 5,850,954 A | * | 12/1998 | Dong-Joo | H04M 1/04 224/197 |
| 5,913,781 A | * | 6/1999 | Vidmar | A01G 1/08 16/223 |
| 6,128,876 A | * | 10/2000 | Nitschke | E04B 2/7425 403/174 |
| 6,176,641 B1 | * | 1/2001 | Schenk | B23Q 1/0063 248/223.41 |
| 6,200,062 B1 | * | 3/2001 | You | F16B 12/20 403/230 |
| 6,202,570 B1 | * | 3/2001 | Kurtsman | H02B 1/34 108/108 |
| 6,241,317 B1 | * | 6/2001 | Wu | A47C 4/02 297/440.1 |
| 6,305,873 B1 | * | 10/2001 | Tauchi | E21D 11/083 403/320 |
| 6,474,901 B1 | * | 11/2002 | Thurston | F16B 12/50 403/381 |
| 6,595,592 B1 | * | 7/2003 | Wieland | A47C 4/024 297/440.15 |
| 6,637,707 B1 | * | 10/2003 | Gates | A47B 81/005 211/64 |
| 7,107,719 B1 | * | 9/2006 | Scott | A01K 85/18 43/42.09 |
| 7,207,757 B2 | * | 4/2007 | Mengel | F16B 5/0092 411/24 |
| D547,637 S | * | 7/2007 | Blacker | D8/354 |
| 7,252,273 B2 | | 8/2007 | Lewellen | |
| 7,252,339 B2 | | 8/2007 | Owens | |
| 7,255,511 B2 | * | 8/2007 | Dolan | F16B 12/125 108/153.1 |
| 7,300,111 B2 | * | 11/2007 | Huang | A47C 4/02 297/440.14 |
| 7,467,721 B2 | * | 12/2008 | Choi | A47B 47/00 211/189 |
| 8,356,954 B2 | | 1/2013 | Koch | |
| 8,389,857 B2 | * | 3/2013 | Petrillo | H05B 39/088 174/50 |
| 8,544,805 B2 | * | 10/2013 | Virgin | A47G 1/1606 248/205.3 |
| 8,646,843 B2 | | 2/2014 | Koch | |
| 8,667,911 B2 | | 3/2014 | Brandenberg | |
| 8,720,156 B2 | * | 5/2014 | Porter | E04F 13/0853 411/349 |
| 8,777,319 B2 | | 7/2014 | Brandtner | |
| 2002/0187017 A1 | * | 12/2002 | Rogers | F16L 321/02 411/349 |
| 2003/0231925 A1 | * | 12/2003 | Chen | E04C 3/06 403/294 |
| 2004/0037636 A1 | * | 2/2004 | Babcock | F16B 5/0084 403/353 |
| 2005/0089363 A1 | * | 4/2005 | Curtis | A61F 2/76 403/362 |
| 2006/0033368 A1 | * | 2/2006 | Longnecker | A47C 4/02 297/248 |
| 2006/0233605 A1 | * | 10/2006 | Vendetti | F41G 11/003 403/381 |
| 2007/0063118 A1 | * | 3/2007 | Owens | A47C 4/02 248/300 |
| 2007/0252041 A1 | * | 11/2007 | Ebner | B64C 1/066 244/131 |
| 2009/0016807 A1 | * | 1/2009 | Koch | A47C 17/02 403/26 |
| 2010/0034582 A1 | * | 2/2010 | Howlett | F16B 5/0052 403/333 |
| 2010/0189492 A1 | * | 7/2010 | Green | A47B 96/202 403/71 |
| 2010/0254757 A1 | * | 10/2010 | Saul | A47C 4/02 403/404 |
| 2014/0059829 A1 | | 3/2014 | Weber | |

* cited by examiner

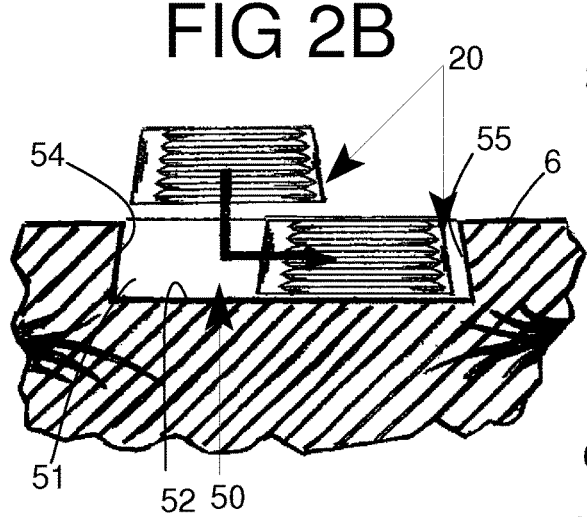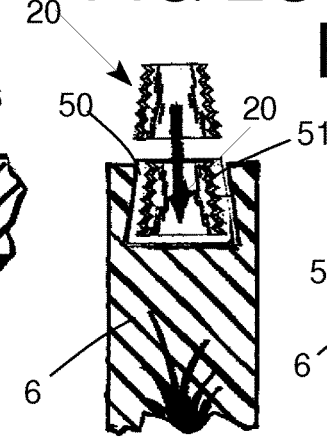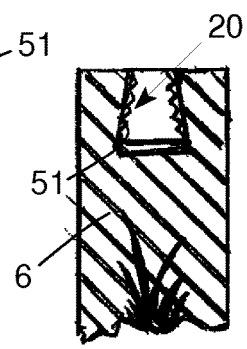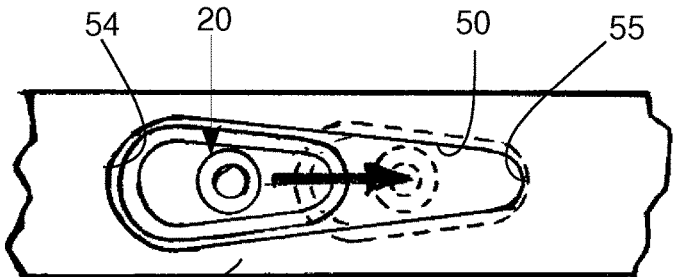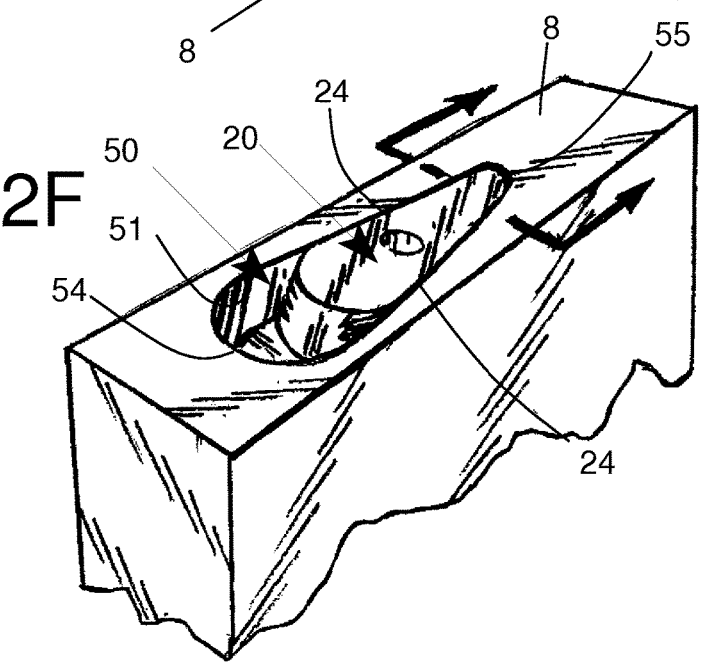

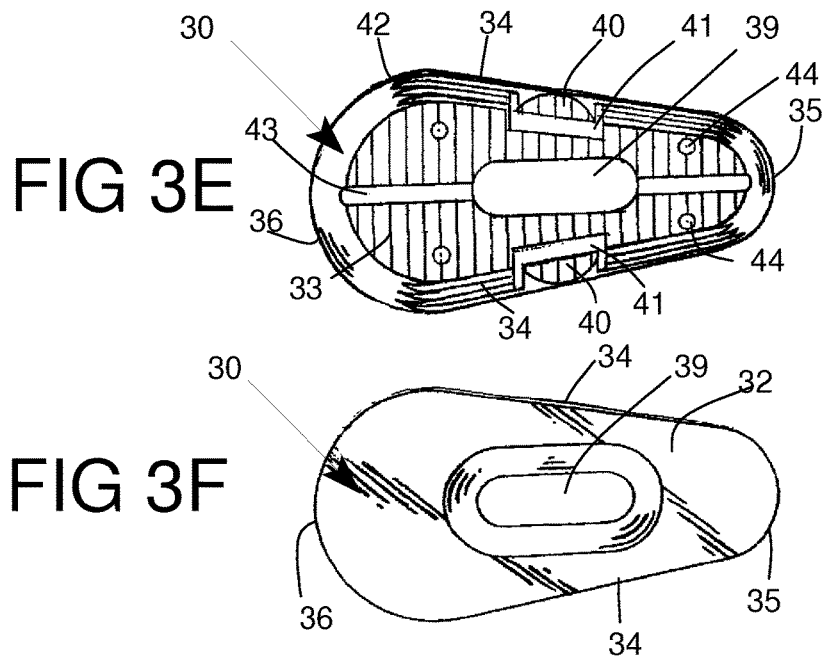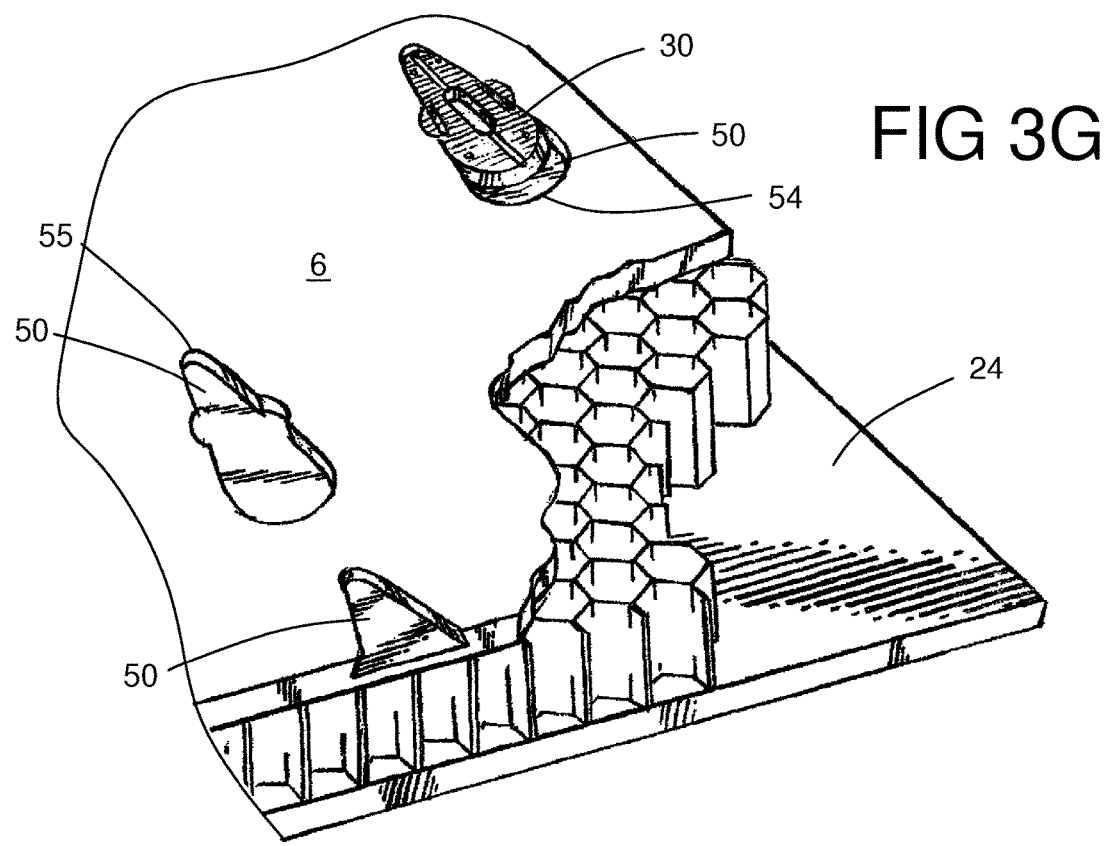

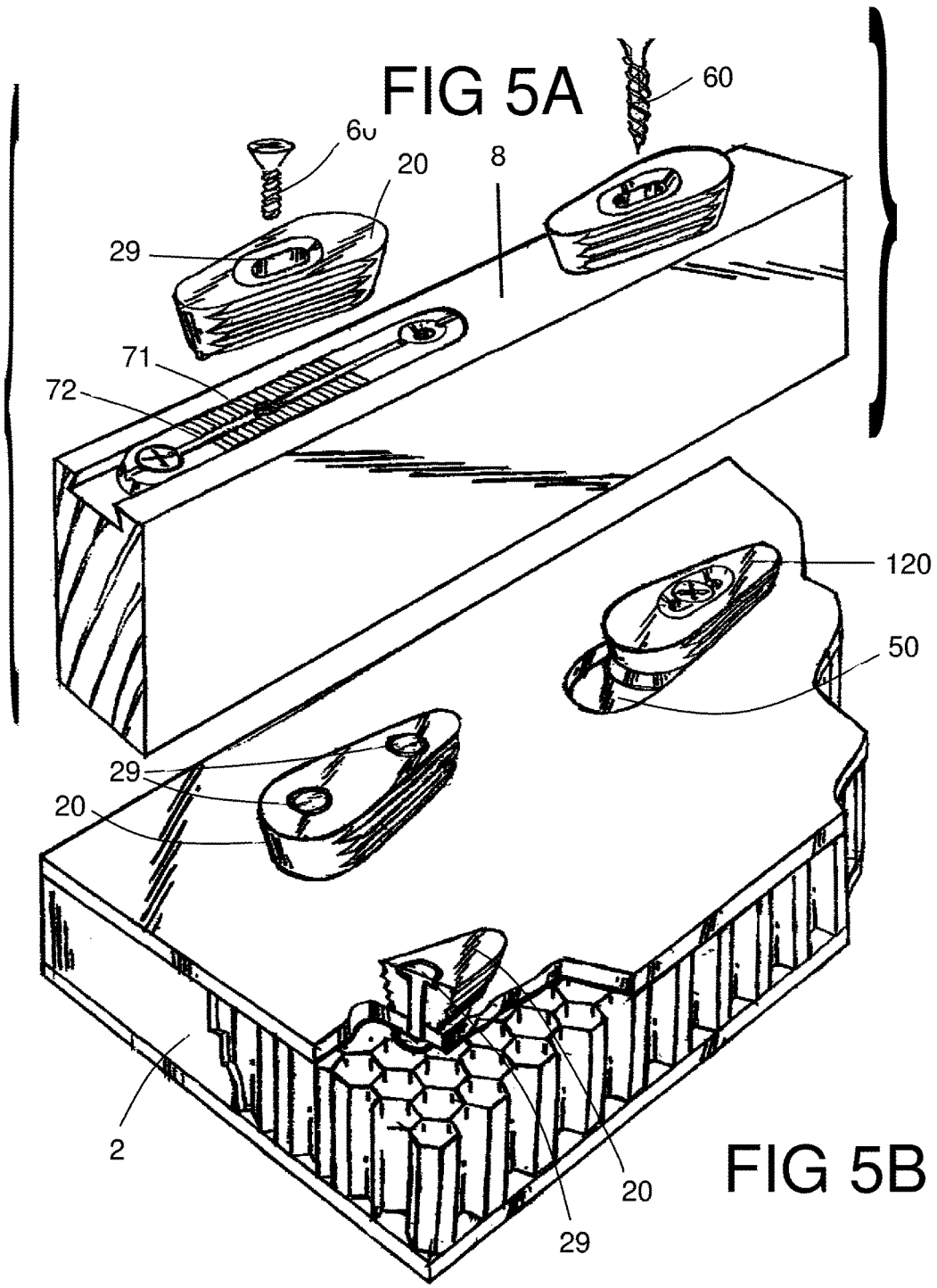

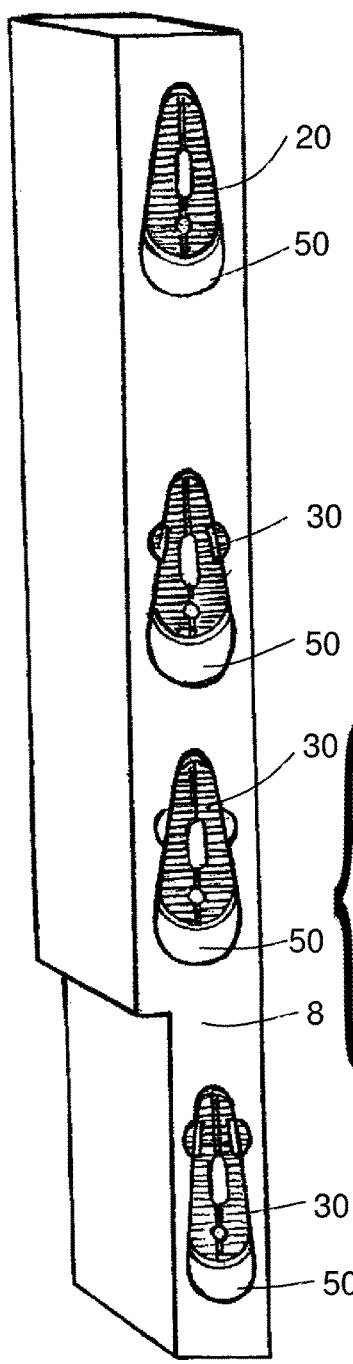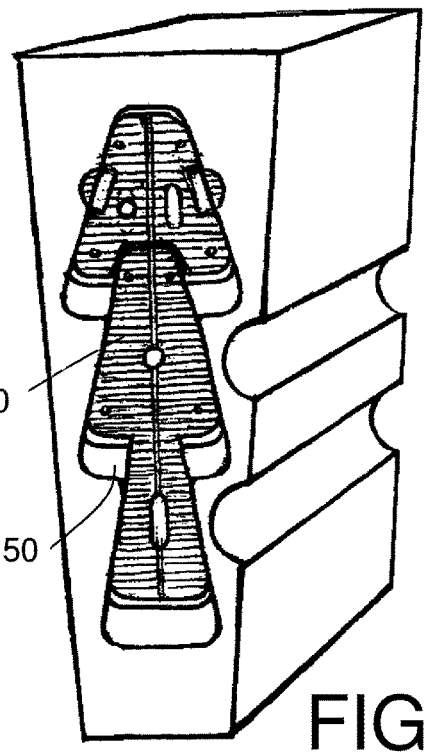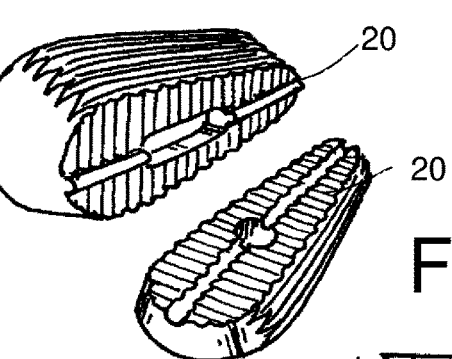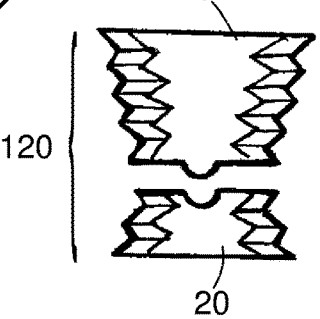
FIG 9
FIG 10
FIG 11A
FIG 11B

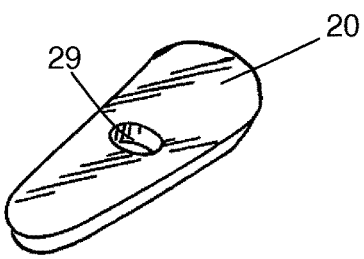
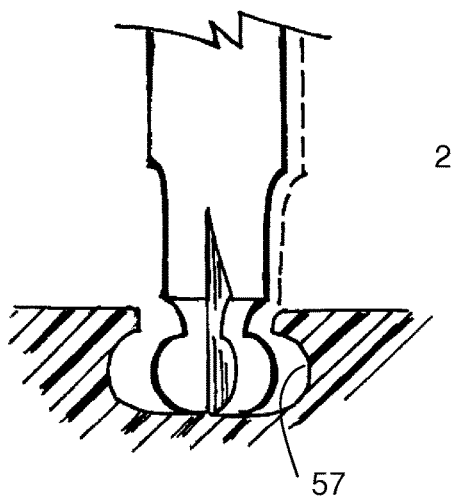
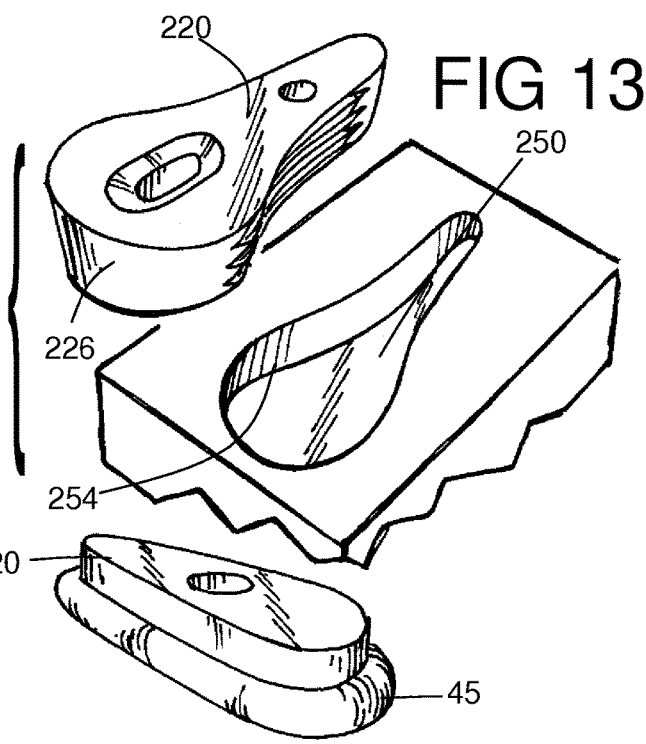
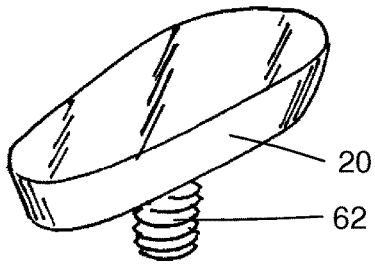
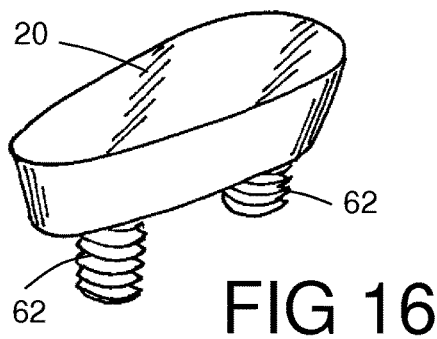

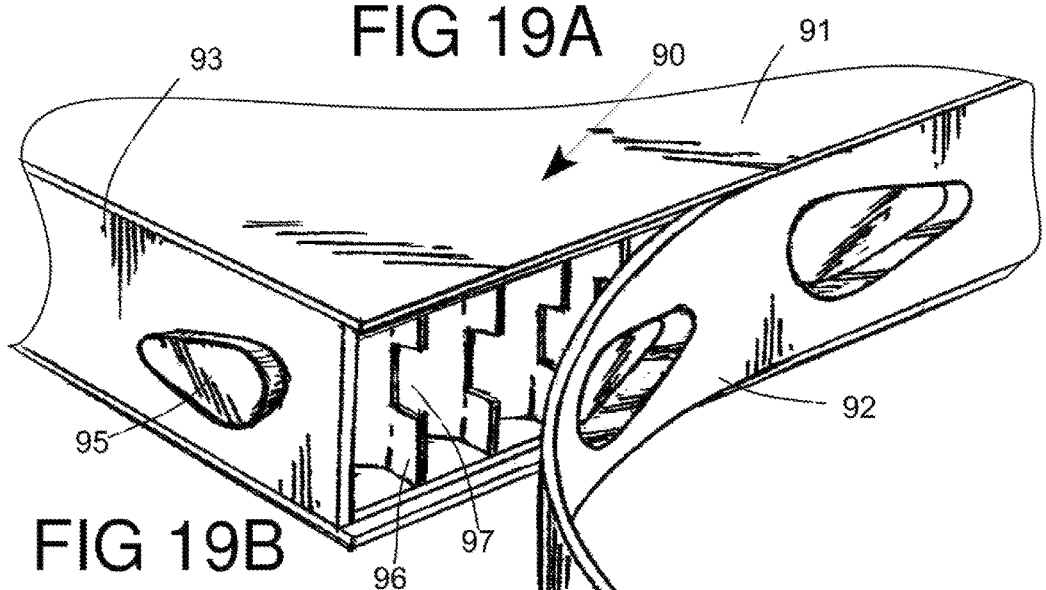
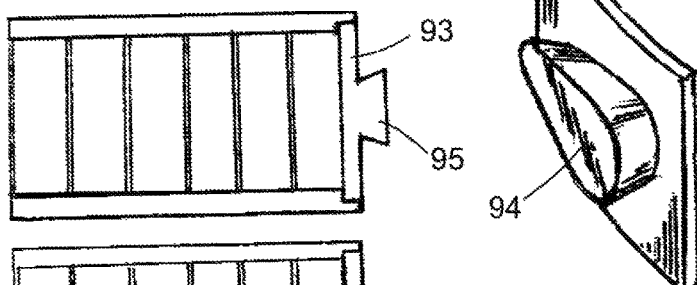
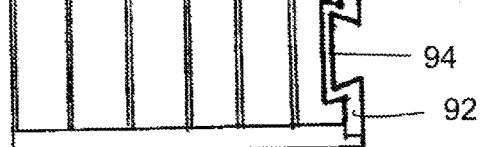
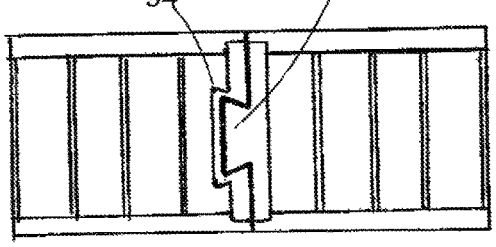

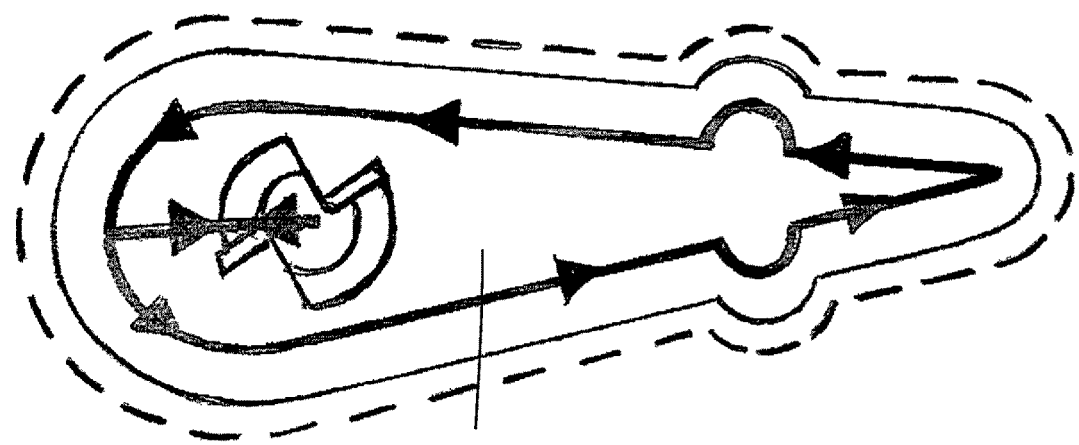
50  FIG 26A
FIG 26B
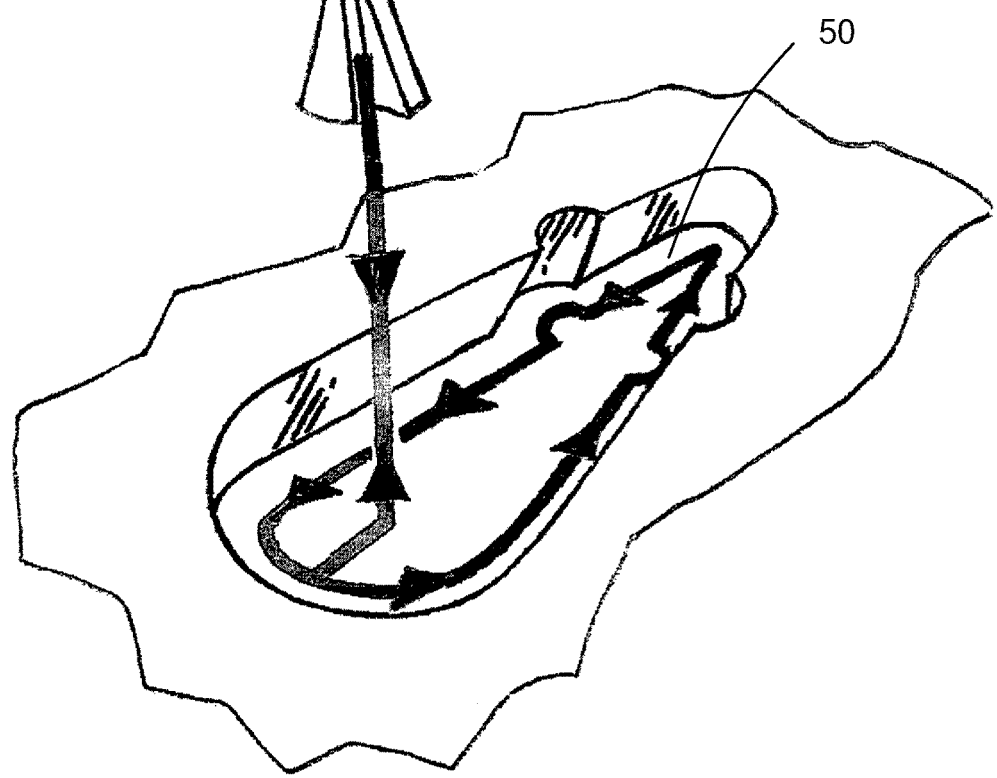
50

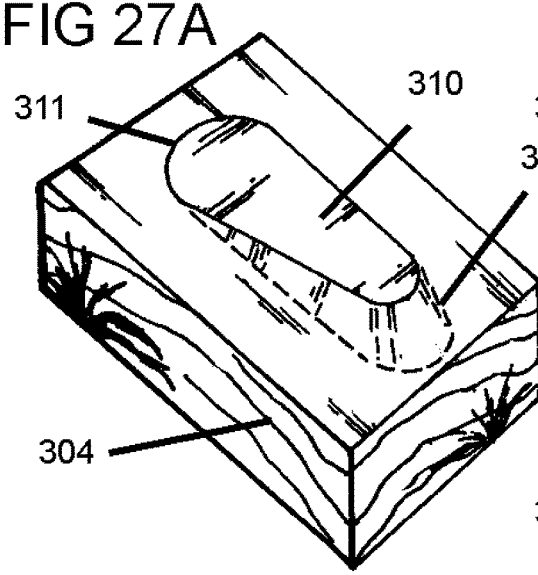
FIG 27A
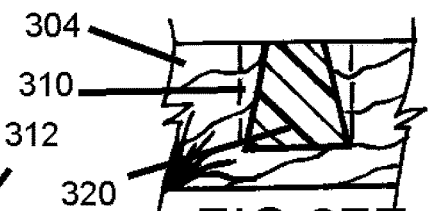
FIG 27E
FIG 27F
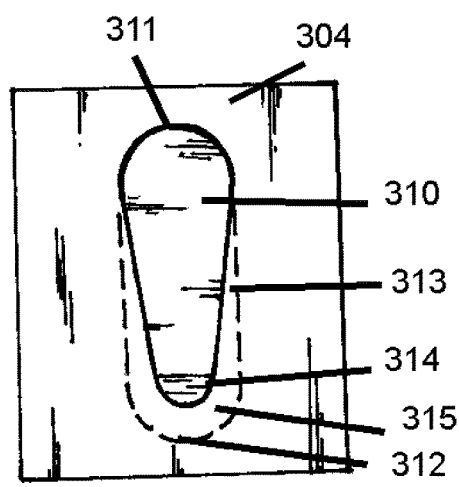
FIG 27B
FIG 27C
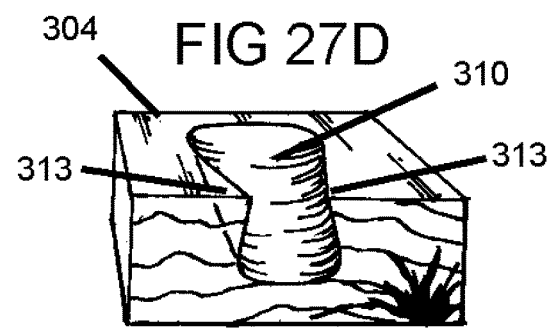
FIG 27D
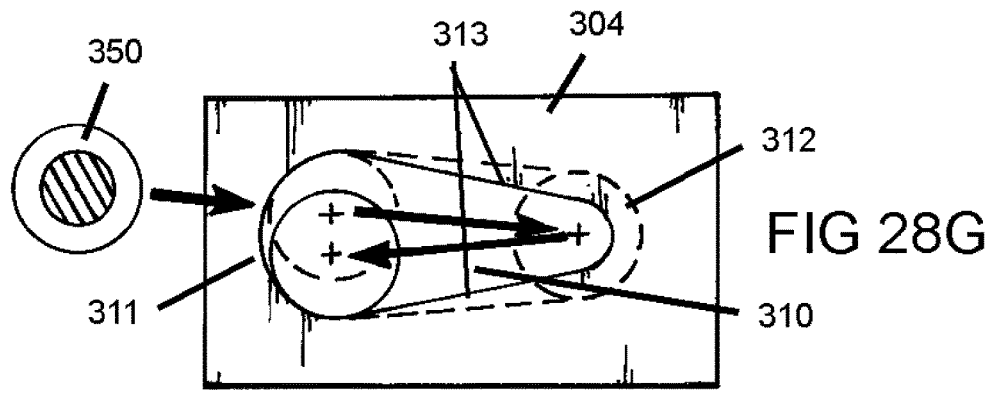
FIG 28G

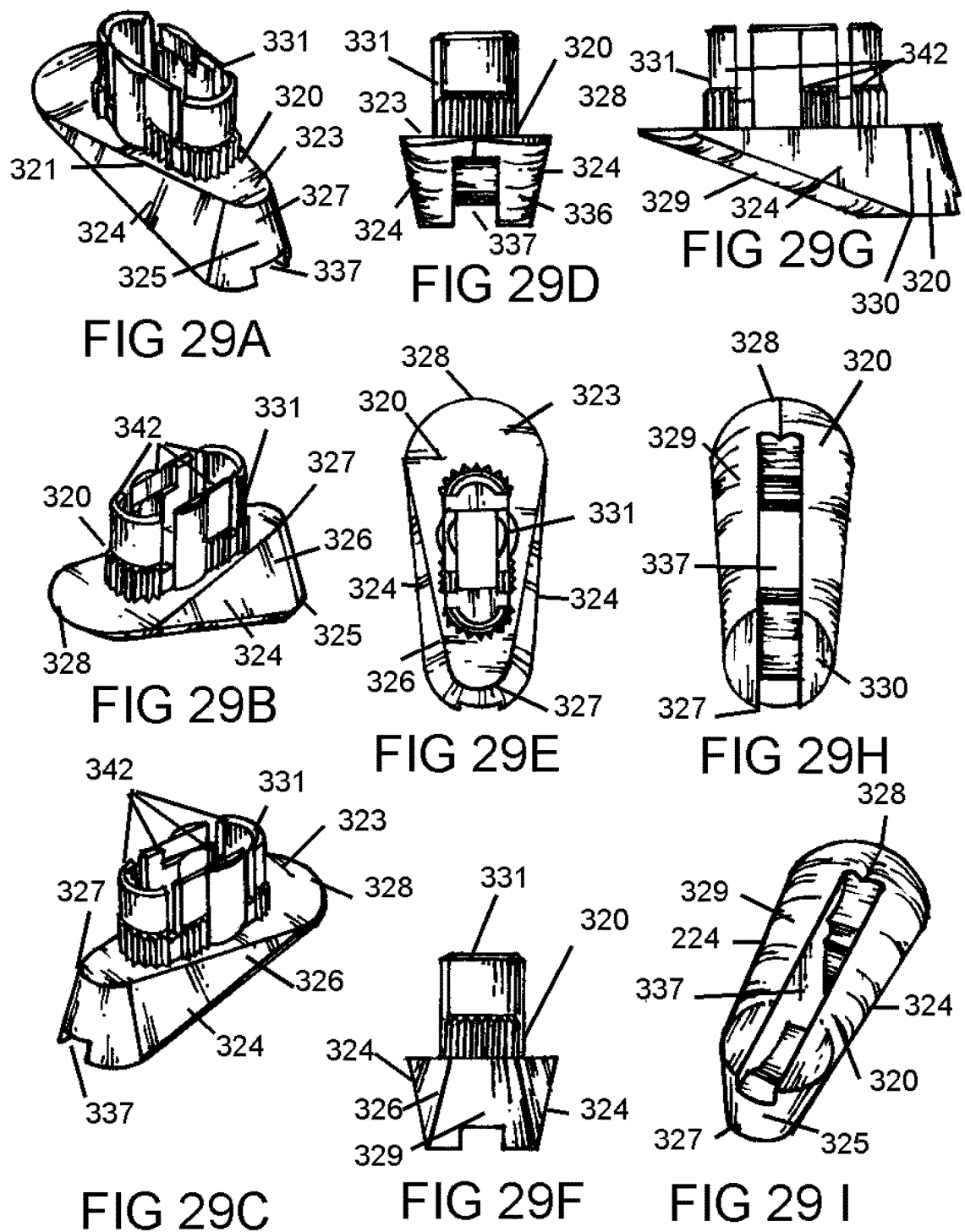

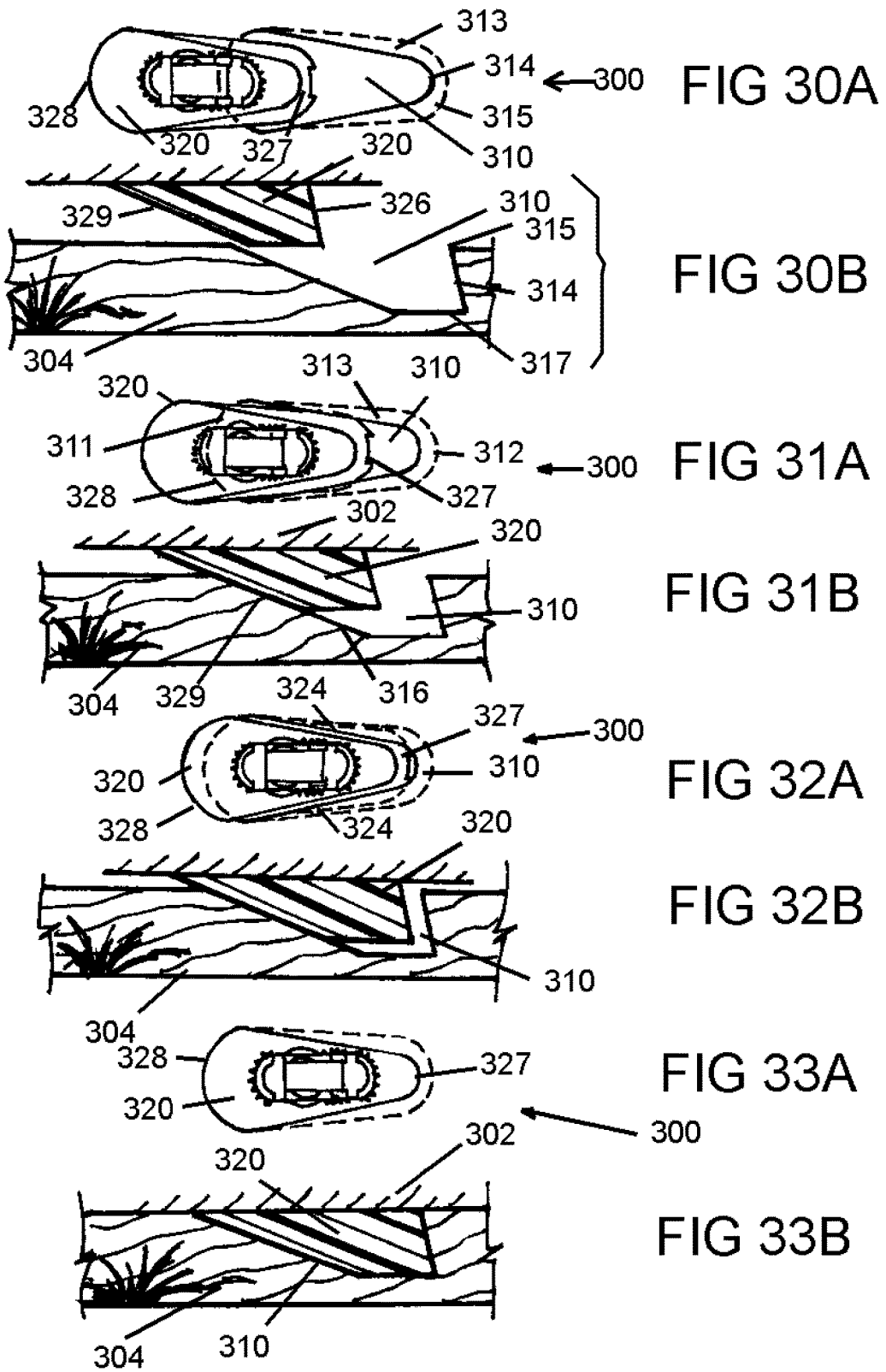

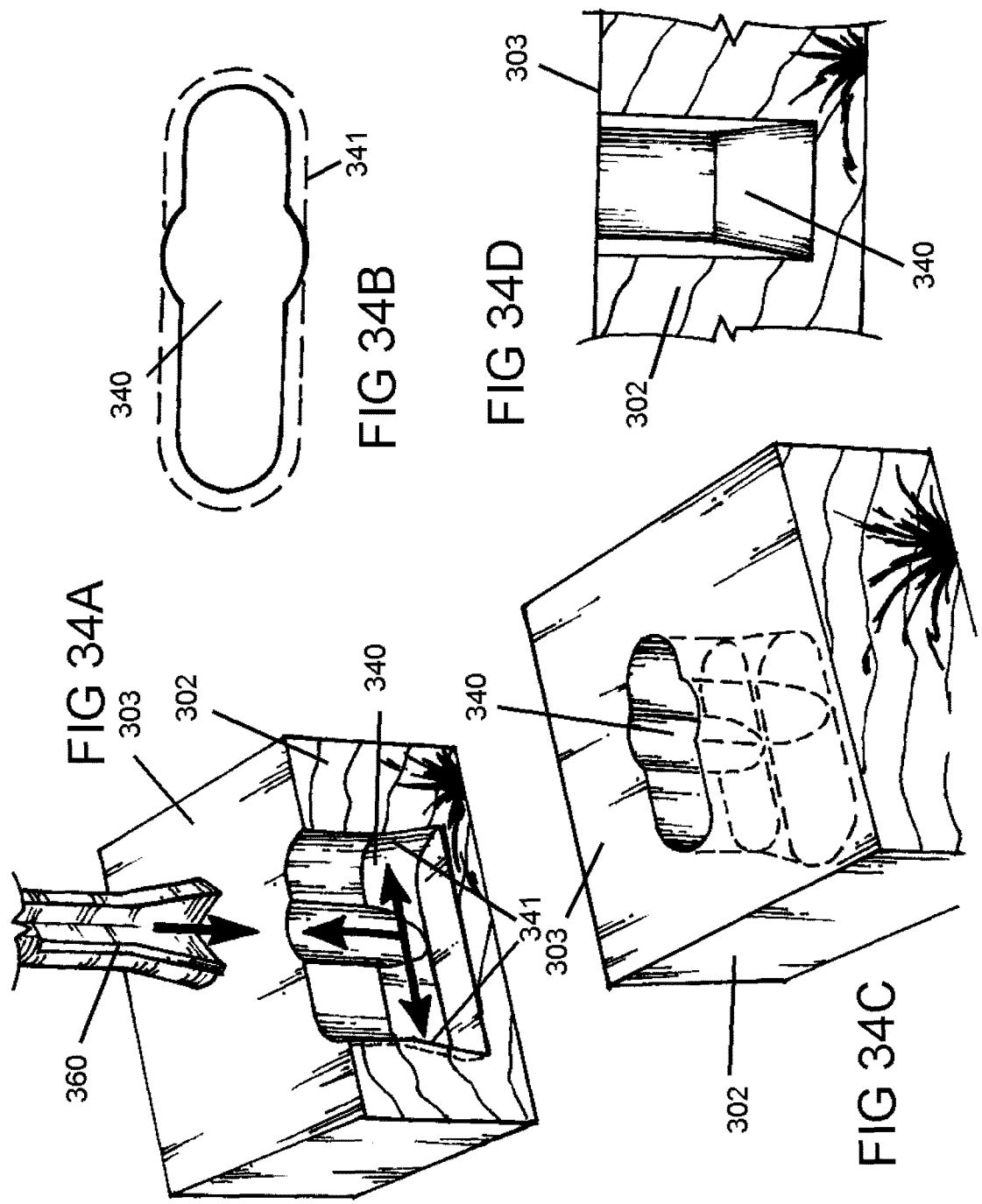

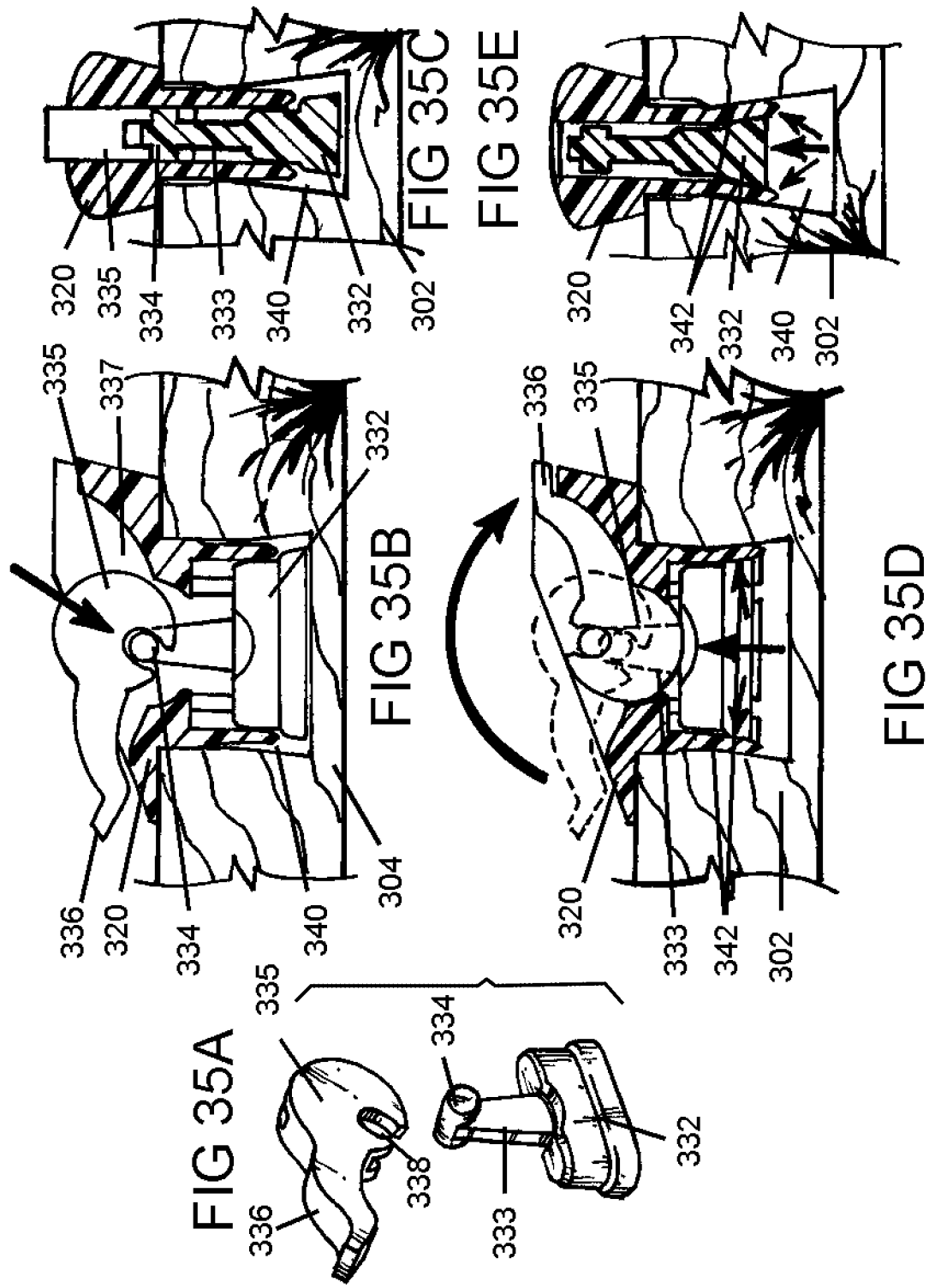

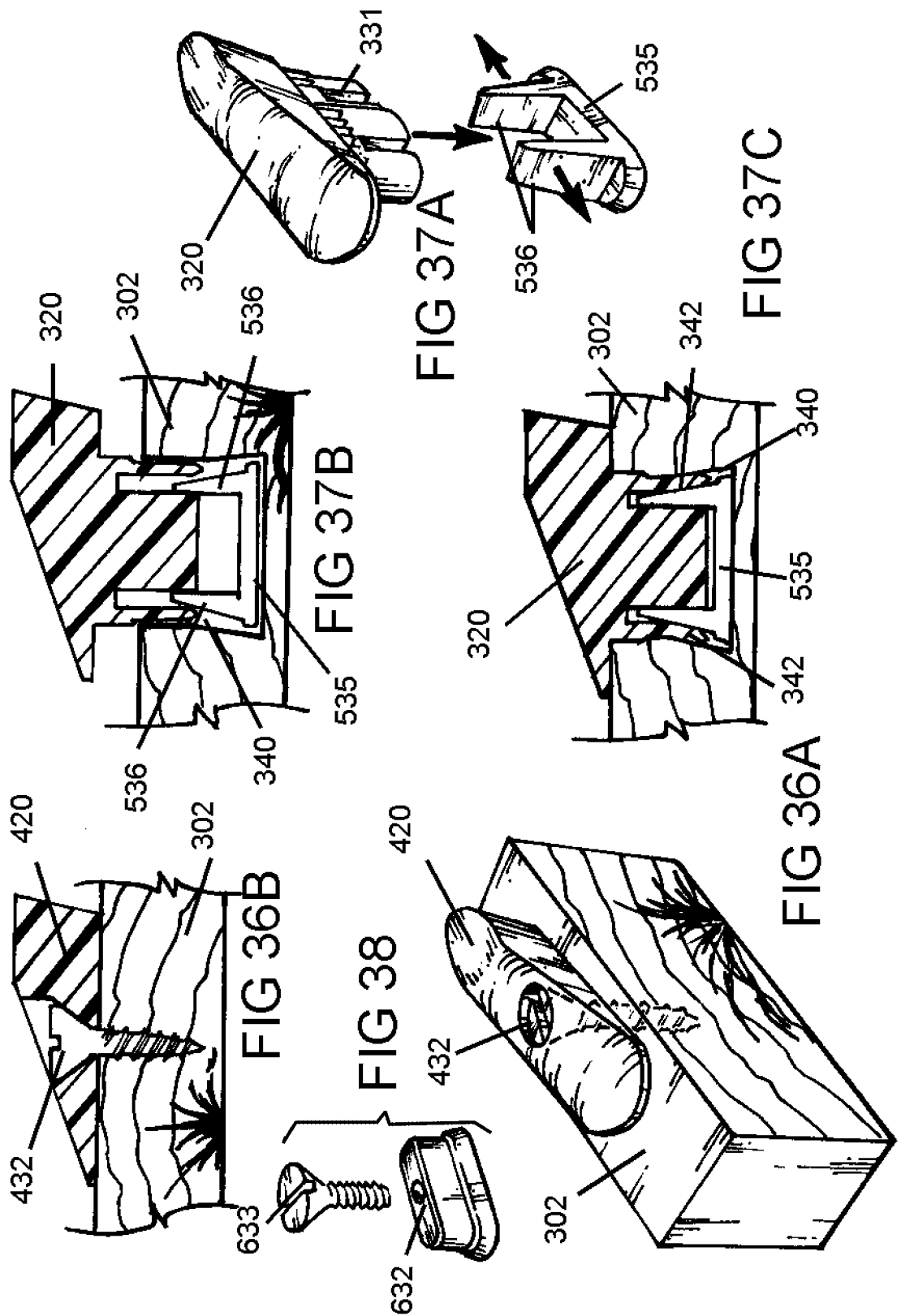

CONNECTOR SYSTEM FOR RAPID ASSEMBLY AND DISASSEMBLY OF PANELS AND OTHER MEMBERS

CROSS REFERENCE TO PRIOR CO-PENDING APPLICATION

This application claims the benefit of prior co-pending Provisional Patent Application 62/002,199 filed on May 23, 2014.

BACKGROUND OF THE INVENTION

Field of the Invention

This invention is related to formation of tight, close fitting joints between two members such as panels of the type used in ready to assemble furniture or members used in stud walls and especially for attaching or joining wood based components. This invention is also related to male and female dovetail connectors or connector profiles.

Description of the Prior Art

In wood related products a balanced distribution of force with equal strength between mating portions of two members to be joined together is preferred. A dovetail slot that is routed along an entire edge of a panel, with a good fitting dovetail inserted along the entire length of the edge of the panel, has so much bearing surface between the two parts that the thinner wall on the outside of the sections can withstand a relatively significant amount of lateral pressure. Often referred to as a French dovetail, this type of connection is used widely in assembling drawer parts that are ten inches wide or less. However, the amount of resistance to insertion or removal of a well fitting through dovetail connection of this type is relatively significant and therefore much too cumbersome for use in connecting larger furniture components, wall sections or relatively large panels. These conventional dovetail configurations are therefore unsuited for applications such as ready to assembly, or knock down, furniture or for use in assembling stud walls or large panel members.

A very tight dry conventional sliding dovetail joint in wood products, with moisture changes that cause the wood products to swell and shrink at the manufacturing site and shipping the product around the world to many different climates has been virtually impossible in a production manufacturing environment. The instant invention will address and overcome these problems.

There are examples in the prior art of sliding dovetails that are made of rigid plastic and metal to make non-flexing connections in joining smaller parts. However, the friction created in larger panels would be so great it would be extremely difficult to assemble without special equipment, and are not designed to be disassembled. Semi-rigid plastic/metal sliding dovetails that flex so they can be inserted vertically into a dovetail slot are also easily flexed when torqueing pressures are applied to the connected members, so they are unsatisfactory in creating a solid non-flexing connection between members.

Straight dovetail slots are also used in hangers in which the dovetail slot has an open end, and a male member having a companion dovetail slot is inserted a female dovetail slot on the hanger. These dovetail slots are straight. These hangers are not used to join panel members or ready to assemble furniture because they do not provide a means for forming a tight, close fitting joint nor are they suitable for use in the panels because the panels would be weaken in the manner previously discussed.

Metal trapezoidal connectors are employed in some ready to assemble or knock down furniture, but these trapezoidal members protrude from the furniture components on which they are employed. There are not therefore suitable for forming tight, close fitting joints. Commercial trapezoidal connector are typically too large to be employed on ¾" thick or slimline panels.

Other prior art connector configurations are employed for ready to assemble or knock-down furniture. Although these prior art connector configurations do allow panel members to be assembled together to form furniture, such as desks or tables, there are several problems with these prior art connector systems. First, these commercially available connector systems do not lend themselves to any degree of preassembly and shipping, and therefore a purchaser must first install the connector components in individual components. Installation of these conventional connectors therefore complicates the assembly process for the ultimate purchaser, especially those without mechanical ability. These conventional connector systems also require the use of tools for installation of the connectors or to interlock mating connectors. Disassembly, which is not even possible in some situations, only adds more problems, and can further deteriorate the structural integrity of ready to assembly products using conventional connector systems. Conventional connectors, normally shipped as loose piece items, may reduce assembly labor, but they lead to cumbersome final assembly that is time consuming and often leads to an unsatisfactory final product. A previous unsatisfactory experience will often cause customers to avoid subsequent purchases of ready to assembly furniture and other products.

Some prior art assemblies use adhesives to permanently glue RTA or ready to assembly products together, primarily because the other RTA fastening systems do not hold tightly together over long periods of time. These prior art RTA systems periodically usually need some retightening. Also the materials typical RTA connectors are made of pot metal or are cast and can break into pieces with repeated assembly. Therefore some users glue RTA components together during the first assembly.

Commercially available RTA cam lock connectors require a visible access point to tighten or release the connectors with a tool. These visible openings may have decorative covers, but either when these openings are visible or when covered they are aesthetically undesirable. The connector system of this invention does not require such accessible and visible openings.

The connector system according to this invention is designed to stay tight over long periods of use, and not need retightening. The connector system of the present invention is also designed to be easy to assemble and disassemble repeatedly, so taking it apart to move it to another location is easy. Most other RTA products are very labor intensive, and therefore most purchasers do not want the hassle of taking it apart and then reassembling.

U.S. Pat. No. 8,356,954 discloses a system for connecting modular components, especially suited for use with upholstered furniture instead of panels of the type used in case goods. A male connector having a conical or spherical surface protrudes from one modular component and is received within a keyhole slot that is formed in or attached to a second modular component. The keyhole slot can be formed by a router or other tool in a wooden frame member or in a separate piece that can be attached to the wooden frame member. The keyhole slot has a generally circular opening, through which the male connector can be inserted, and a narrower slot extending from the circular opening. A tapered or beveled surface extends from the bearing surface of the slot, which otherwise extends perpendicular to the face of the component in which the keyhole slot is formed. This tapered or beveled surface slopes between the portion of the slot joining the circular opening and an opposite closed end of the slot. This tapered or beveled surface can be formed by movement of a router or router bit transverse to the main surface of the component in which the keyhole slot is formed as the slot is formed. As the male connector moves along the slot toward the slot closed end, the male connector will be cinched tighter relative to the component containing the keyhole slot. Modular upholstered components, the thickness of which cannot be easily controlled, can thus be tightly secured by the connector system disclosed in U.S. Pat. No. 8,356,954.

SUMMARY OF THE INVENTION

The instant invention overcomes the problem of the large insertion and removal force that prevents the use of long dovetail connections in connecting large panels or members, such as those employed in ready to assemble, or knock down, furniture, stud walls or structures employing panels that are relatively large in comparison to the connectors. The connector system of the instant invention allows male and female connector parts with dovetail sides to be drawn tightly together and also disengaged with only a relatively small movement. Multiple dovetail male and female connectors can be used along the joint between two components, such as two panels, and will draw the two joined components together to substantially the same degree as a conventional dovetail slot and will achieve substantially the same strength as a dovetail slot without requiring the relatively large movement required for insertion or retraction of a dovetail member extending along at least most of the length of a joint.

The relatively shorter connectors of the instant invention have a bearing surface between male connectors and female connectors, or the bearing surface forming a female connector profile, that is only a fraction of the bearing surface of a through dovetail running the entire length of the joint. Pressures applied to mate the connector is concentrated on the connectors, an anchoring device attaching the male connector to one of the panel members and the wall sections of the female connector recess or profile.

Because of their shape conventional sliding dovetails are always assembled by sliding the male part through into the female opening on the side of another member. A key objective of the instant invention is to create an invisible dovetail joint by inserting the dovetail connection vertically into a cavity. Previously an invisible dovetail joint required that the dovetails form a finger locking configuration and that the dovetails be hidden in a mitered joint. That can not be applied for most joint applications. Sliding dovetails can be stopped from passing through one end of the connection and are invisible on that end. The converging sides of the instant invention allow a cavity or recessed female profile in one component to accept a male connector dropped into it vertically or at an angle and then fully received in at least a portion of the female cavity or recessed profile that matches the converging design of the male connector achieving a totally invisible connection.

The ability to repeatedly and easily assemble and disassemble a sliding dovetail joint is an important consequence and object of the instant invention. Creating close enough tolerances to make a very tight joint without glue in wood related products is very difficult. Common assemblies of dovetail joints especially in woodworking (mostly drawers and some structural parts) are all assembled permanently with glue, so there has to be space between the mating surfaces for the glue. Prior to assembly, as the the glue is applied to the dovetail surfaces, the water in the glue causes the wood fibers to swell making it necessary to quickly assemble the parts. Because of the immense friction between the mating surfaces of sliding dovetails it is not practical to try and make dry fitting joints that can be easily disassembled. The instant invention provides a joint between panel members that can be assembled without glue. It should be understood, however, that glue can be applied as a secondary means of securing panel members or components employing the instant invention.

The converging angles on the side of the elements of the connector system of the instant invention substantially allow frictionless insertion and travel to the point where the male and female mating surfaces fully engage. At the point of engagement of the male/female surfaces there is considerable friction. Ribs on the sides of one version, but not all versions, of the male connector can either cut into the side walls of the female cavity or are slightly deformed themselves to achieve a strong non-flexing rigid connection. In other embodiments, the exterior shape of the mating surface of the male connectors will substantially match the interior shape of the female connector profile.

Multiple smaller connectors can be employed along the edges and sides of large members in any combination of numbers and spacing. They may be used individually, attached together mechanically, or molded together as one piece. Because of the frictionless nature of inserting the connectors, disengaging the assembled joints requires an initial force to break friction of the connectors. Movement measured in the thousands of inches will lead to the frictionless separation and disassembly of members. Furthermore, this assembly can be completed without the use of tools and the connectors need not be supplied as loose piece items. In those applications where the female connector profile is formed as a recess in one of the panels of matable members, no additional fabrication process is necessary, because recesses are typically necessary even when the connectors are supplied as loose piece items. Indeed when compared to conventional cam lock loose piece connectors, the instant invention actually requires one less initial manufacturing operation because a cam lock connector requires separate boring operations at ninety degrees to each other. The female connector profile of the instant invention requires only one recess to be formed into a panel for each connection.

The connector system according to this invention can employ the same male connectors and the same female connectors or female profile along either the edges of a panel member or on the flat surface of a panel. For instance these connectors are suitable for use along the edge of a three-forth inch (¾") thick panel as well as on the surface or side of a laminated or composite panel member. In order to be used along a panel edge, this connector system strikes a balance between the widest footprint that will fit along the panel edge for easy alignment and insertion of a male connector into a female connector profile or recess and the thickness necessary to maintain enough wall thickness to provide sufficient strength so that the panel material adjacent to the connection will not deflect. The male connector can also be relatively thin so that the same connectors can be employed on relatively shallow sides of a panel formed of wood or wood related products, such as composite panels, medium density fiberboard or other engineered wood products. In such applications, only the thin exterior sheet of a composite structure may have sufficient strength to carry the structural loads that must be borne if the panel structure is not to be damaged during anticipated use. The instant invention employs a double tapered configuration in which one taper performs in substantially the same manner as a dovetail and the other taper provides a relatively wider entry portion and a relatively narrower load bearing portion when the male connector is fully inserted into a mating female connector or female connector recess or profile.

As depicted in representative embodiments described herein, a male connector can be attached to a first component, such as a panel, to mechanically attach the first component to a second component, which can also be a panel. The male connector can be inserted into a converging female profile with inwardly diverging side. This male connector has a body with an outer face and an inner face. The male connector also has a mounting member. The body can be attached to the first component by the mounting member with the inner face abutting the first component. Opposite sides of the body extend between the outer face and the inner face. The sides of the body are inclined between the outer and inner faces so that the outer face is larger than the inner face. The opposite sides of the body also converge toward a forward end of the body so that the forward end of the body is narrower than a rear end of the body. The opposite sides engage side walls of the converging female profile to mechanically attach the first component to the second component.

According to another aspect of this invention, a connector system, for attaching first and second components together, includes a male connector and a female profile. The male connector can be mounted to protrude from the first component and the female profile is formed on the second component. The male connector has a tapered body with a forward end narrower than a rear end and with inclined sides extending between an outer face and an inner face so that the outer face is wider than the inner face. The female profile comprises a tapered recess converging from an open end to a closed end forming opposite converging side walls that are also inclined relative to an exterior surface of the second component so that a narrowest section of opposite converging side walls is on the exterior surface of the second component. The inclined sides of the male connector engage the inclined converging side walls of the female profile when the male connector is inserted into the female profile. The tapered body is laterally shiftable relative to the tapered recess upon lateral movement of the first component relative to the second component to position the forward end of tapered body flush with the closed end of the tapered recess to fasten the first component to the second component.

Male connector and a female connector profiles, as depicted in the representative embodiments, can be part of an assembly formed by at least first and second panels joined together by a male connector and a female connector profile. The female connector profile comprises a recess in one panel. This recess has an open end and a closed end with side walls converging from the open end toward the closed end so that the closed end is smaller than the open end. The male connector can be inserted into the open end and then moved laterally into the female connector profile. Side walls of the female profile are also inclined from an external portion of one panel to a larger width on an interior portion of that panel, so that the female profile comprises a double tapered recess. The male connector has a tapered body having a forward end and a larger rear end and an outer face and an inner face. Opposite sides on the tapered body converge from the rear end toward the forward end. Each side diverges outwardly from the inner face to the outer face, so that the opposite sides are inclined relative to at least one of the outer and inner faces and converge from the rear end to the forward end. The multiple male connectors are attached to another panel in position to mate with multiple female connector profiles on the one panel, by relative movement of the two panels so that the male connectors engage of corresponding female connector profiles to join the two panels.

BRIEF DESCRIPTION OF THE DRAWINGS

FIGS. 1A and 1B are respectively three dimensional views from the rear and front of the male connector. FIGS. 1C and 1D are top and bottom views and FIGS. 1E-1G are front, side, and rear elevational views.

FIGS. 2A-2E show the manner in which the male connector can be wedged into a recess, such as a recess that can be formed by routing with the recess being wider at one end than at the other end. FIG. 2F shows the male connector fully wedged into the recess.

FIGS. 3A-3G show a second embodiment of this invention in which the male connector includes a deflectable tab. FIGS. 3A and 3B are bottom and top three dimensional views respectively. FIGS. 3C and 3D are side and rear views, and FIGS. 3E and 3F are bottom and top views. FIG. 3D show this male connector and the female recess or profile in which this version of the male connector can be inserted. FIG. 3G shows the use of this connector system with a panel having light weight hollow core.

FIG. 4G shows the male connector digging into the sidewalls and FIG. 4H shows deformation of the male connector.

FIGS. 5A and 5B demonstrates several ways to attach the male connector to a first panel member along either an edge or a face of the first panel member.

FIG. 9 shows the manner in which male connectors of the embodiments of both FIGS. 1A-G and FIGS. 3A-F could be employed on the same panel members.

FIG. 10 shows a gangable version of the male connectors.

FIGS. 11A and 11B show a two piece version of the male connector that would permit adjustment of the relative position of one portion of the male connector relative to a panel. This could be a field adjustment or could be made after the connector system has been in use for a long period of time.

FIG. 12 is a low profile version of a male connector according to this invention.

FIG. 13 shows another version of the male connector and a corresponding female profile in which the sides of each are curved.

FIGS. 14A-14C show another version in which a lip could be formed in a female recess for receiving a version of a male connector with a cylindrical protrusion.

FIG. 15 shows a version of a male connector that could be mounted by using a single dowel.

FIG. 16 shows another version, similar to FIG. 15, in which two dowels could be used to mount the male connector.

FIGS. 19A-19D show strips of male and female connectors that can be incorporated in edging strips of a panel members. FIG. 19B shows the profile of a strip with a protruding male connector and FIG. 19C shows the female connector. FIG. 19D shows two panels mounted end to end using these edging strips.

FIG. 23A shows the component panels with connectors mounted thereon, and FIG. 23B shows an assembled cabinet.

FIG. 25A is an exploded view showing a connector and a frame or decorative accent. FIG. 25B is an enlarged exploded view of the connector, which is circled in FIG. 15A.

FIGS. 26A and 26B show the manner in which a female connector profile, with which the male connector of FIGS. 3A-3B could be used, can be routed in a panel or other member.

FIGS. 27A-27D are views of the alternate embodiment of a recessed female profile. FIG. 27A is a three dimensional view of a converging recessed female connecting profile that can be formed by a conical router following an inclined path. FIG. 27B is a plan view of the female profile shown in FIG. 27A. FIG. 27c is a side sectional view of this female profile and FIG. 27D is a partial section sectional view between opposite ends of this female profile. FIGS. 27E and 27F are sectional view taking at different locations between opposite ends of a female sectional profile showing a mating male connector received within the recessed female connecting profile of FIGS. 27A-27D.

FIGS. 28A-28G are views depicting formation or definition of the recessed female profile of FIGS. 27A-27F by a conical router bit or a generatrix, its geometric equivalent. FIGS. 28A to 28C are side sectional views showing movement of a router bit from a first position to a second position at opposite ends of the female profile. FIGS. 28D-F are three dimensional views and partial sectional views showing formation of a portion of the recessed female profile. FIG. 28G shows the path (directrix) that would be followed by a router bit (generatrix) to form the female recessed profile of FIGS. 27A-27D with converging sidewalls.

FIGS. 29 A-29I are views of a male connector suitable for use with the recessed female connecting profile shown in FIGS. 27A-27D and in FIGS. 28A-28G. FIGS. 29A-29C are three dimensional views taken from various perspectives to show both the mating and mounting portions of this connector. FIGS. 29D and 29 F are views of opposite ends of this male connector shown in the plan view of FIG. 29E. FIGS. 29G and 29I are a three dimension views showing the inclined interior or bottom surface of this male connector, the bottom plan view of this connector shown in FIG. 29H.

FIG. 30A is a top view and FIG. 30B is a side view of a converging male connector at an initial stage of insertion into a corresponding recessed and converging female profile.

FIG. 31A is a top view and FIG. 31B is a side view of a converging male connector partially inserted into a corresponding recessed and converging female profile.

FIG. 32A is a top view and FIG. 32B is a side view of a converging male connector at having been further inserted into a corresponding recessed and converging female profile.

FIG. 33A is a top view and FIG. 33B is a side view of a converging male connector fully seated in a corresponding recessed and converging female profile.

FIGS. 34A-34D are views showing a compartment that will receive a mounting protrusion on the male connector of FIGS. 29A and 29B to mount this male connector to a first component or panel. FIG. 34A is a three dimensional view, partially in section, and FIG. 34C shows this compartment in hidden lines. FIG. 34B shows the outline of the compartment when seen from above and FIG. 34D is a sectional view showing this compartment.

FIGS. 35A-35E are views showing a mounting mechanism, including a cam, that can be used to mount the male connector of FIGS. 29A-29I in a panel or other component so that this panel or component can be subsequently inserted into a female profile shown in FIGS. 27A-27D in a separate panel of component. FIG. 35A is a three dimensional view of a cam and a cooperating wedge that can be used with this male connector. FIGS. 35B and 35C are partial sectional views of this cam mounting mechanism with the cam in a retracted position. FIGS. 35D and 35E are similar partial sectional views of the cam mechanism in an operative position in which the male connector is secured to a corresponding panel or component.

FIGS. 36A and 36B are views showing the manner in which a male connector, similar to that shown in FIGS. 29A-28I can be mounted to a panel or component using a simple fastener, such as a screw. FIG. 36A is a three dimensional view and FIG. 36B is a side sectional view.

FIGS. 37A-37C are views showing the manner in which a connector similar to that shown in FIG. 29A-29I can be secured to a panel or component. FIG. 37A is an exploded three dimensional view. FIG. 37B is a view, partially in section, showing this assembly in a retracted position and FIG. 37C shows this alternate assembly in an operative position securing a male connector in a recess.

FIG. 38 is an exploded schematic view of a version in which a standard fastener, such as a wood screw, could be used in conjunction with a wedge to attach a male connector in a compartment formed in a panel or component on which the male connector is to be mounted.

DETAILED DESCRIPTION OF THE PREFERRED EMBODIMENTS

Figure 1A:
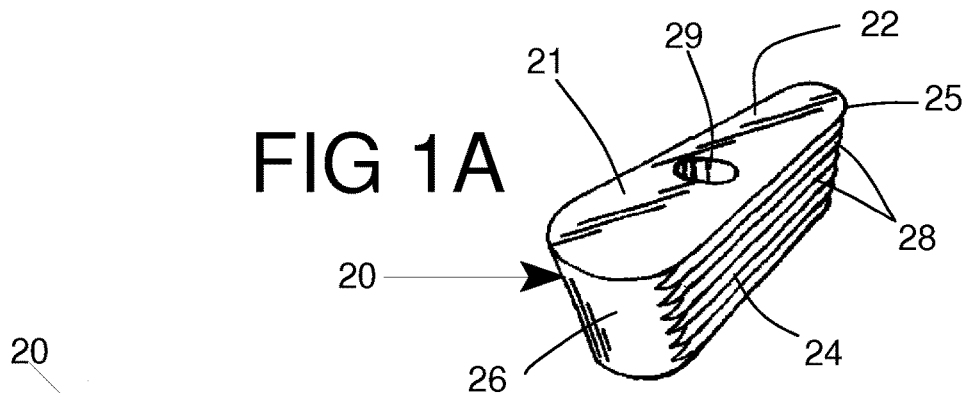
FIGS. 1A-1G are views of the basic male connector according to this invention.

The connector system 10 according to one embodiment of this invention is suitable for use in assembling panels and other members or in attaching a first member 2 to a second member 4. One important use of this connector system 10 would be the use of male connectors 20 or 30 and corresponding female connectors or female recesses or female profiles 50 to assemble two panels 2, 4 together to form a subassembly. Other components or panels could then be joined to this subassembly to form a completed assembly. For example, this connector system 10 could be employed to assemble a piece of furniture from a plurality of panel members 2, 4 equipped with the connectors forming this system. This connector system 10 could be employed in a ready to assemble or knock down furniture member, such as a cabinet, a desk, a table, drawers and any number of different ready to assembly furniture items, where the connectors could be formed or mounted on individual panel members prior to shipment. The male connectors 20 and 30 themselves are small and therefore would not complicate shipping. This connector system 10 is also suitable for repeated assembly and disassembly of ready to assembly, knock down or modular furniture or other modular assemblies. Furthermore this connector system allows final assembly to be toolless and greatly simplifies such assembly by purchasers of ready to assembly furniture or other products, who otherwise may lack both the experience and the mechanical ingenuity to satisfactorily assemble the final product. This invention is by no means limited to use with ready to assemble furniture, the primary representative embodiments of panel members, subassemblies or assemblies discussed herein are ready to assembly furniture items. Other representative uses of this connector system are also discussed herein, but this connector system is suitable for use in other items as well, and such uses would be apparent to those of ordinary skill in the art.

The connector system 10 according to this invention comprises one or more male connectors 20, 30 that are each matable with a female connector or recessed female profile 50. In the preferred embodiment of this invention, the male connectors 20, 30 are normally separate members or part of a separate strip of male connectors that are to be mounted to a panel or other member by physical attachment, such as by separate fasteners, screws, nails rivets or by any number of conventional fastening members. Details of these male connectors or male connector subassemblies will be individually discussed in more detail. The female connectors or female profiles 50, also forming part of this connector system 10, can be discrete connectors and/or female connector subassemblies as are the male connectors, but the female connectors 50 can also be recesses or profiles formed directly into and forming a surface of the panel 4 or other component to be attached to a panel 2 or member containing a male connector or male connector assembly. For example, the female connector 50 can be a recess that is formed by routing the recess directly into a panel member or by using other means for removing material by cutting, milling or by use of CNC equipment or other machining or wood wording techniques. Therefore the term female connector 50, as employed herein, is intended to refer to separate female connectors or female connector subassemblies or recessed female profiles that are attachable to panel or other members or to profiles or recesses that are formed into a panel or other component.

Many, if not most, of the various uses of this connector system 10 would employ multiple male and female connectors 20, 30, 50. For instance it would be common to employ at least three male or three female connectors along a single face 6 or edge 8 of a panel member, and connectors in many cases would be employed along each edge of a panel member. The male connectors 20, 30 are small and would not therefore interfere with shipping individual panels 2 as part of a ready to assemble kit or with shipping panels 2, 4 in bulk from a first facility in which the panels are fabricated to a second assembly facility, which might be a second manufacturing plant, a retail outlet or even directly to the premises of the ultimate customer, such as a homeowner, where final assembly would take place. Although the male connectors will protrude from the panels or other members, the height of a typical male connector with ready to assembly furniture could be only five sixteenth inch ($5/16"$), which would be minimal and would not result in a packaging or shipping problem.

Figure 1B:
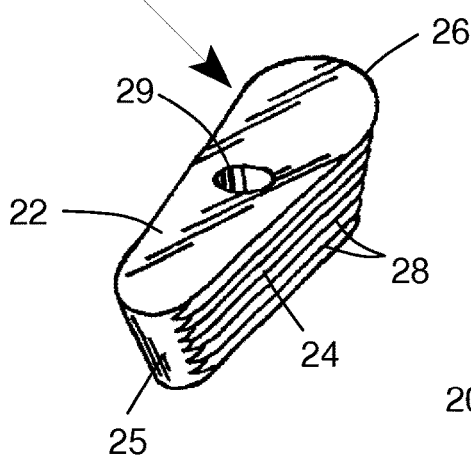
Figure 1C:
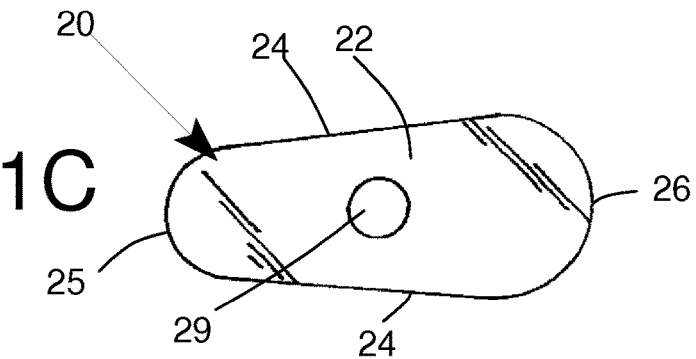
Figure 1D:
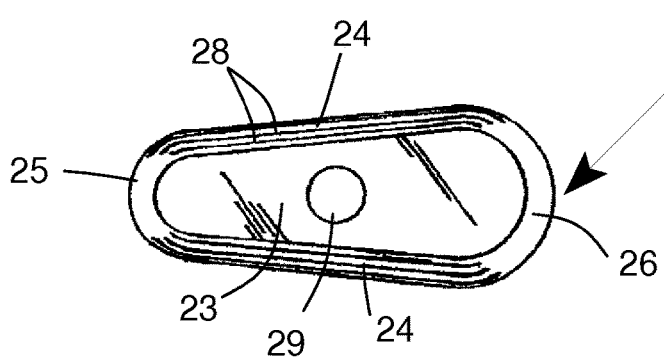
Figure 1E:
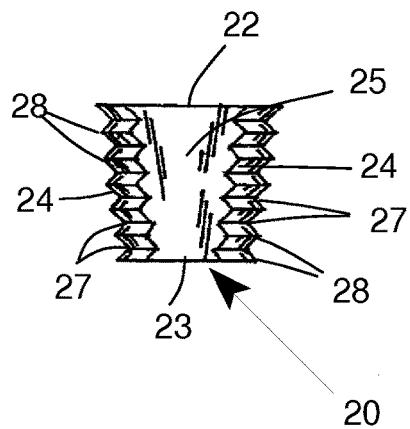
Figure 1F:
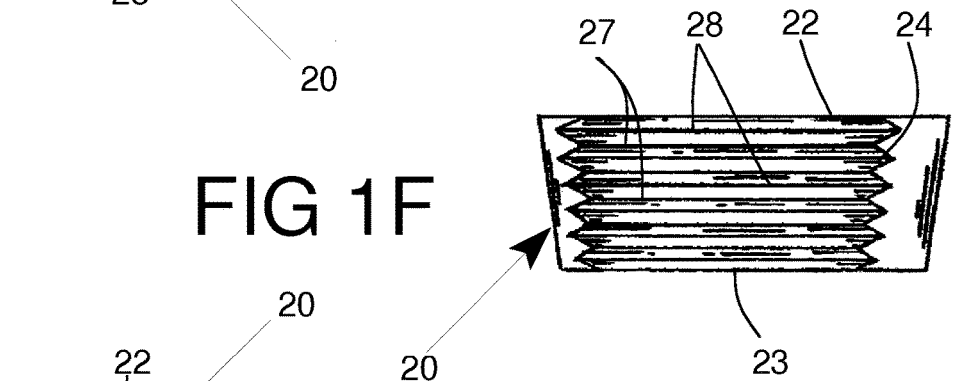
Figure 1G:
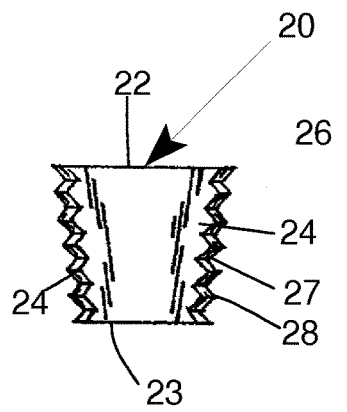

Both the male connectors 20, 30 and female connectors 50 according to this invention have a tapered or converging body 21 with sides that converge from one end toward another end and which are slanted or inclined between top and bottom faces or inner and outer faces or surfaces. FIGS. 1A and 1B show the double taper configuration of a male connector 20 representative of a first embodiment of this invention. Opposite side or side edges 24 of the male connector 20 are tapered or inclined in two directions. The female connector or recessed female profile 50 will have corresponding side walls 51 that are tapered at approximately the same angles as the male connector sides 24. It should be understood, however, that in this embodiment the length of the female connector or female recess or profile 50 is greater than the length of the male connector 20 and the maximum width of the female connector or profile 50 will be greater than the maximum width of the male connector 20. In other embodiments, to be discussed subsequently, the exterior shape of the male connector will conform to the interior shape of the female connector profile, and the difference in length will be insignificant.

In one example of this first embodiment of the male connector 20 depicted in FIGS. 1A-1G, the sides 24 are inclined at an angle of approximately ten (10) degrees between the rear end 26 and the forward end or nose 25 toward which the sides 24 converge. In this same example, the sides 24 are slanted at an angle of approximately ten (10) degrees between the upper, outer or exposed face 22 and the lower, inner or smaller face 23. These specific angles are merely representative and should not be considered limiting because the precise angles, which may differ, can be chosen to based on the specific use and the specific material that forms the panels or connected members 2, 4. When mated the female connector will partially overlie the male connector to hold the panels, with which the connector system is used, together and keep them from separating.

The male connector 20 of the first embodiment will be attached to one of the panels with the lower face 23 substantially flush with the portion of the panel to which the male connector is attached. Typically the portion of the panel to which the male connector 22 is attached will either be a panel face 6 or a panel edge 8. When attached in this manner, the sides 24 will be slanted relative to the panel surface and will diverge. Similarly the sides 24 will be tapered or inclined relative to the panel surface to converge between the wider rear end 26 and the narrower front end or nose 25. A conventional fastener or mounting member 60, such as a nail or screw or dowel, can be used to attach each male connector to an appropriate surface or edge of a panel member. A hole 29, extending through the connector body 21, from the upper face 22 to the lower face 23 will receive this type of fastener. This configuration is especially suited for use with a removable fastener, which will allow removal or repositioning of the male connector 20. It should be understood that permanent fasteners, such as staples or cleats could also be employed with a male connector of this type, and that in some applications adhesives could be suitably employed to attach the male connector to a panel or other member. With a male connector 20 attached to one panel or member 2, that panel can be attached to a second panel or member 4 by insertion of the male connector 20 into a female connector, recess or profile 50 on the second panel or member 4.

In this first embodiment, attachment of the male connector 20 to the female connector or profile or recess 50 first requires insertion of the male connector 20 into the wider or blunt or entry or open end 54 of footprint of the female connector or recess 50, without engagement of the male connector 20 with the corresponding female connector 50 before the lower face 23 of the male connector 20 engages the recessed face or floor 52 of the female connector or female profile 50. Longitudinal movement of the male connector 20 relative to the female connector or profile 50 after initial insertion is necessary to wedge the male connector 20 into the female connector 50 in an anchoring section of the female connector footprint formed adjacent to the narrower front or closed end 55 to form a tight and secure fit or connection. It should be remembered that this longitudinal movement will normally be accomplished by relative movement of one panel or member 2 relative to a second panel or member 4. Multiple male connectors 20 and female connectors 50 will be employed on each panel so multiple male and female connectors must all be first aligned followed by longitudinal insertion of the male connectors 20 into corresponding female connectors 50 until wedged together in a final position.

Figure 2A:
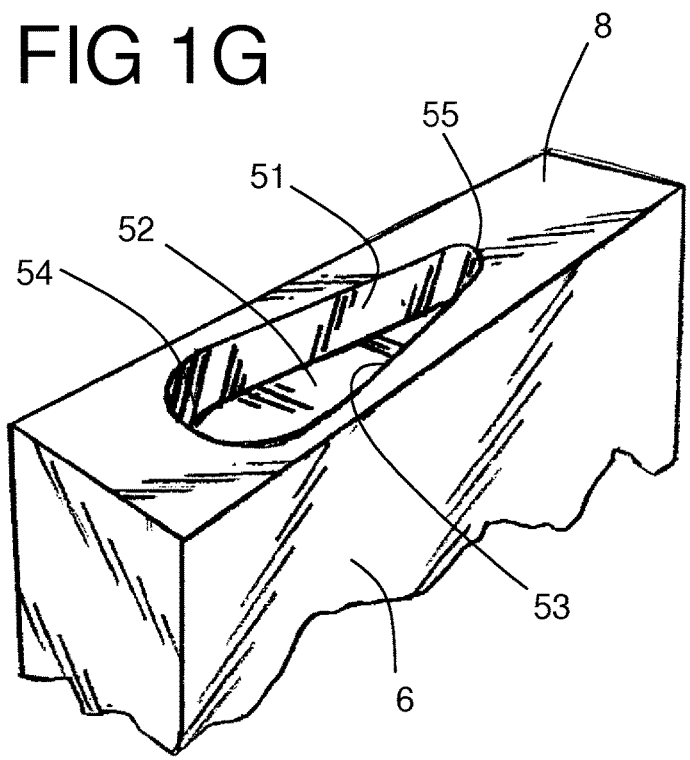

The male connector 20 of this first embodiment has fluted opposite sides 24 with protruding ribs 28 formed between channels 27 of both sides 24. In this embodiment, these ribs 28 are integral portions of a one-piece male connector body 21, and can be formed as the male connector 20 is molded or cast or otherwise fabricated. As the male connector 20 is wedged into the female connector or profile 50, these protruding ribs 28 will engage the sidewalls 52 as the male connector 20 moves toward the narrower front end 55. These ribs 28 will then dig into the sidewalls 28 or be deformed by the sidewalls 28 depending upon the relative hardness of the material from which the male connector 20 is formed and the material defining the female connector, recess or profile 50. If the female connector profile 50 is formed by removing material from a panel 4 and the male connector 20 is formed of a sufficiently hard material, the ribs 28 will dig into the panel 4 and will be wedged tightly therein. FIG. 2A shows a female connector 50 that is formed along a panel edge 8 in a panel 4. As seen in FIGS. 2B-2C, a male connector 50 will enter into the female connector profile 50 adjacent the wider entry end 54 where the female connector 50 is larger than the male connector 20 until the wider exposed face 22 of the male connector 20 abuts the recessed face or floor 52 of the female connector profile 50. After insertion, the male connector 20 is moved longitudinally toward the narrower front end 55 of the female connector profile 50. As the male connector 20 approaches the narrower end 55 the inwardly tapered sidewalls 51 will overlap the outwardly tapered sides 24 of the male connector 20 forming a dovetail connection, which will prevent the male connector 20 from being extracted from or pulled out of the female connector 50 along a straight line. Sufficient movement of the male connector 20 toward the narrow end 55 will wedge the male connector 20 into the female connector profile 50. The tapered, fluted sides 24 will further secure the male connector 20 in place. Either the protruding ribs 28 will dig into the side walls 51 or the protruding ribs 58 will themselves be deformed to form a tighter, more stable fit or engagement.

As seen in FIG. 2E, the final position of the male connector 10 will be in the area in which the female profile 50 is narrower, and therefore the amount of material in the panel edge 8 is greater. FIGS. 2C and 2F show that there is more material present in the final position occupied by the male connector 20 shown in FIG. 2F than in the entry position shown in FIG. 2C resulting in greater strength for the final configuration. For example, if the panel 4 is a standard ¾ inch thick panel, it will be important to maintain enough wall thickness so that the panel 4 will not deflect or fracture adjacent the final position of the male connector 20. This is especially true when the panel 4 is formed from a material, such as an engineered wood product or a medium density fiberboard (MDF), which may not have the same structural characteristics as a solid wood panel. However, this need to maintain the strength of the connection is at odds with the need to provide as large an entry into the female connector profile 50 as possible. A large entry is especially important with multiple male connectors 20 and female connectors 50 are formed along mating edges or surface of two panels 2 and 4 because all of the male connectors 10 must be initially aligned with all of the corresponding female connector profiles 50. The converging tapered shape of both the shorter male connectors 20 and the longer female connector profiles 50 addresses both of these requirements.

FIGS. 3A-3G and 4A-H show a second embodiment of a male connector 30, which includes the basic features of the first male connector 20, but also includes additional components. Male connector 30 has the same basic double taper shape as male connector 20 with opposed sides 34 converging from rear end 36 towards the narrower forward end or nose 35 of the tapered connector body 31. Opposed side edges 34 are also inclined between the wider upper or exposed face 32 and the narrower lower face 32. There are fewer deeper channels 37 and protruding ribs 38 forming the fluted sides 34, but these ribs 38 extend generally between the front end 35 and the rear end 36 as in the previous embodiment. The mounting hole 39 extending through the body 31 is oblong instead of being circular, and this larger mounting hole permits the male connector 30 to be slightly adjusted relative to a fastener 60. This adjustment will not only allow more freedom in initially placing the male connector 30, but it will also allow some degree of adjustment, which can be important when multiple connectors are used on each of two mating panels.

Figure 3A:
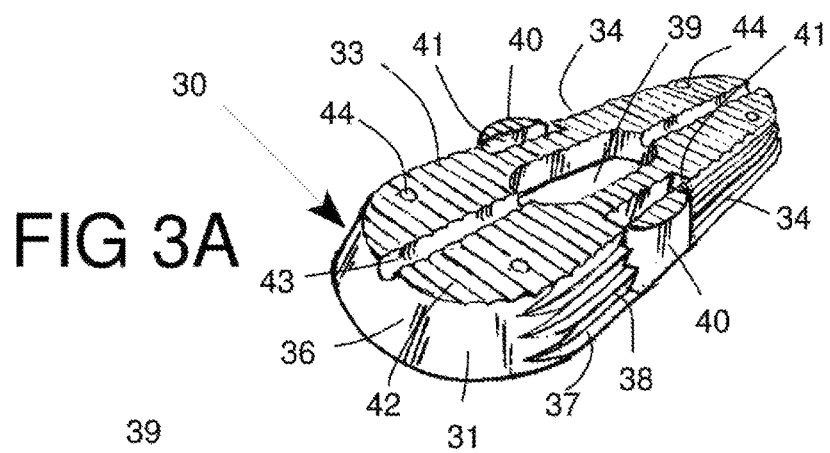
Figure 3B:
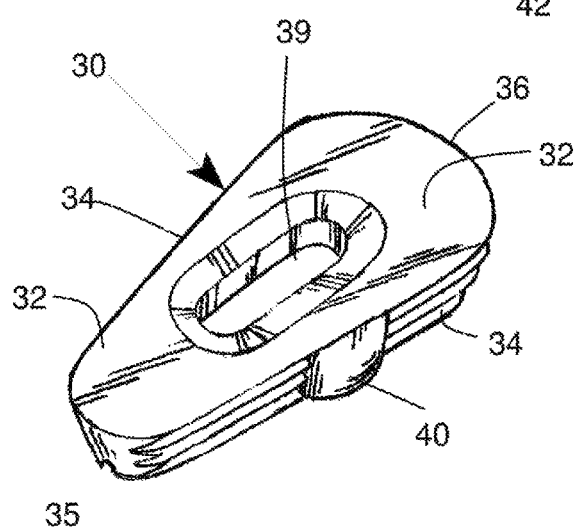
Figure 3C:
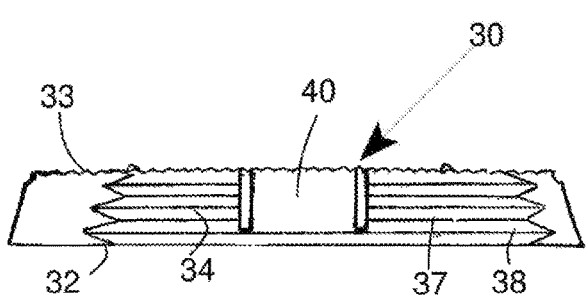
Figure 3D:
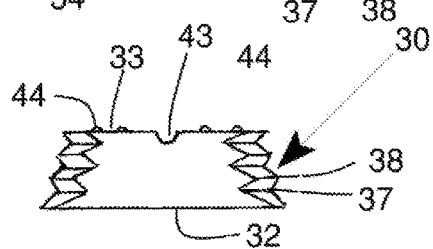
Figure 4A:
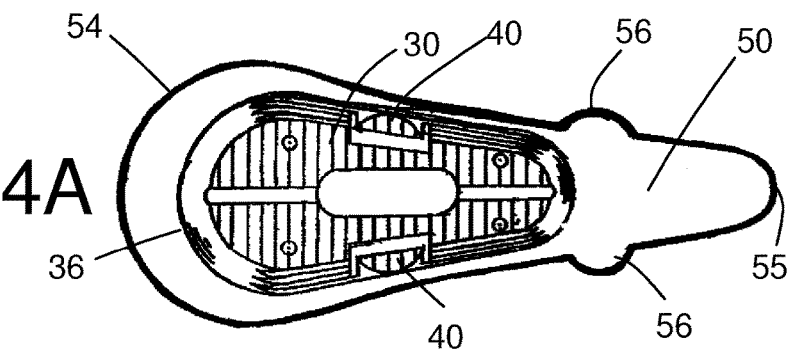
FIGS. 4A-4F demonstrate the manner in which the second embodiment of the male connector can be wedged into a recess with the tab holding the male connector in place.
Figure 4B:
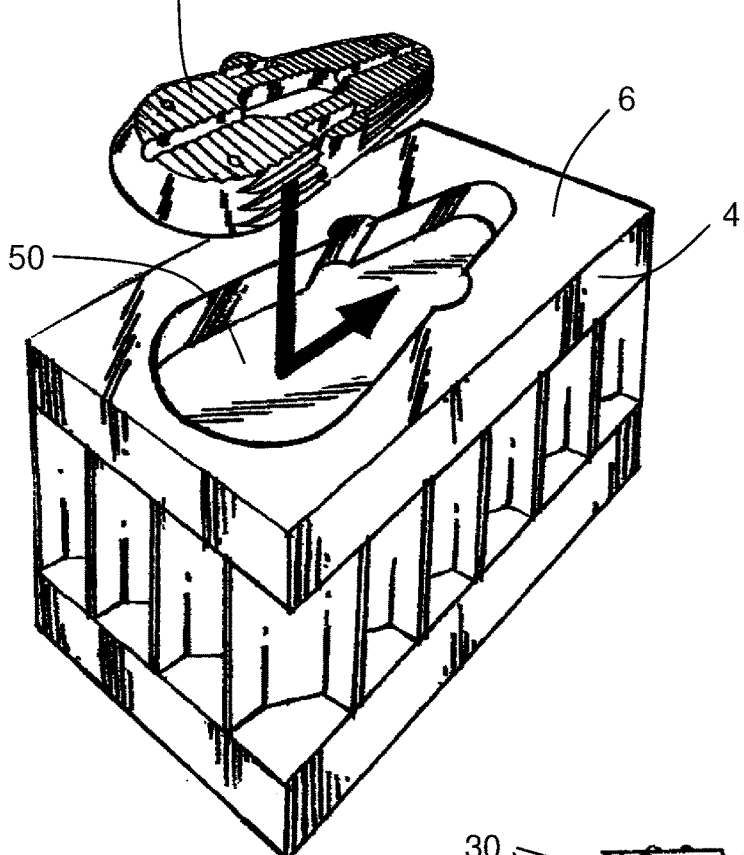

Male connector 30 also includes deflectable tabs 40 extending upwardly along and protruding from the opposite sides 34. These tabs 40 have a rounded outer surface and are joined to the connector body 31 adjacent the wider upper or exposed face 32. Indentations 41 are formed on the inside of each tab 40 so that each tab 40 can flex inwardly, although the normal position of each tab 40 is the extended position shown in FIGS. 3A and 3B. When used with a female profile 50 having corresponding side notches 56, as shown in FIGS. 3G and 4A and 4B, the tabs 40 will provide an additional means of securing the male connector 30 in a final position wedged in the narrower front end 55 of the female profile 50. FIG. 4A also shows that the side walls 51 of the female profile need not be straight lines. In this view the side walls 51 are straight near the forward end 55, with the exception of the side notches 56. This is the area in which the male connector 30 will be wedged into place and where structural loads will be concentrated in a fully assembled connector. However, the side walls 56 are curved outwardly near the rear or entry end 54 to enlarge the target though which the male connectors will first enter. This enlarged entry can be especially significant because it provides greater clearance when it is necessary to align multiple male connectors 30 on a first panel 2 with multiple female connector profiles 50 on a second panel 4.

The lower face 33 of male connector 30 is uneven and in this embodiment includes a number of corrugations 42. This uneven corrugated surface will provide a more stable fit of the male connector 30 on a panel or panel edge when the fastener 60 is sufficiently tightened. Depending upon the hardness of the connector body 31, the corrugations 42 will either dig into the panel surface or will themselves be deformed for a tighter grip. Projections or bumps 44 also extend from the face 33 so that they too can dig into the abutting panel surface to enhance stability. A channel 43 extending between opposite ends of the connector body 31 provides clearance for a registration feature that could be positioned on a panel or panel edge to align a connector 30 or keep that connector from becoming misaligned.

Figure 4C:
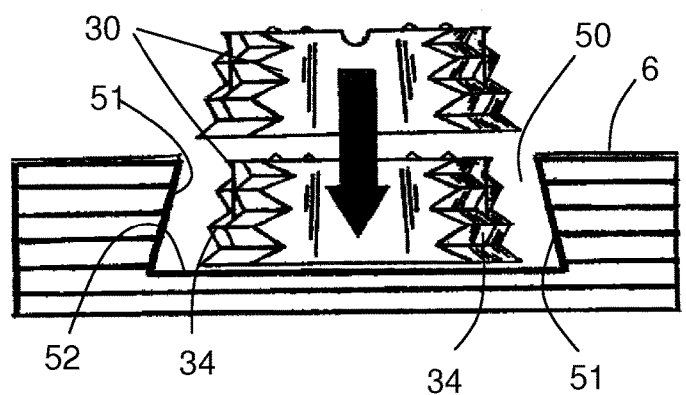
Figure 4D:
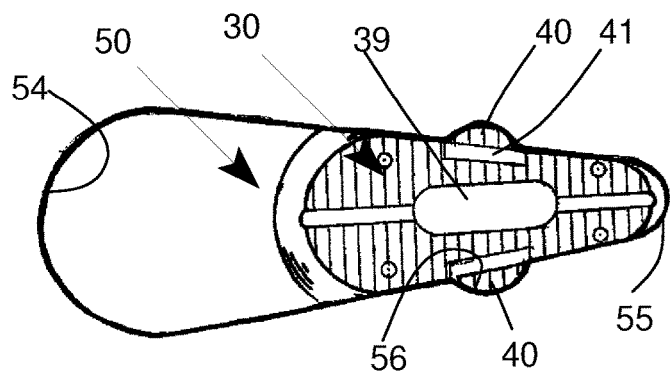
Figure 4E:
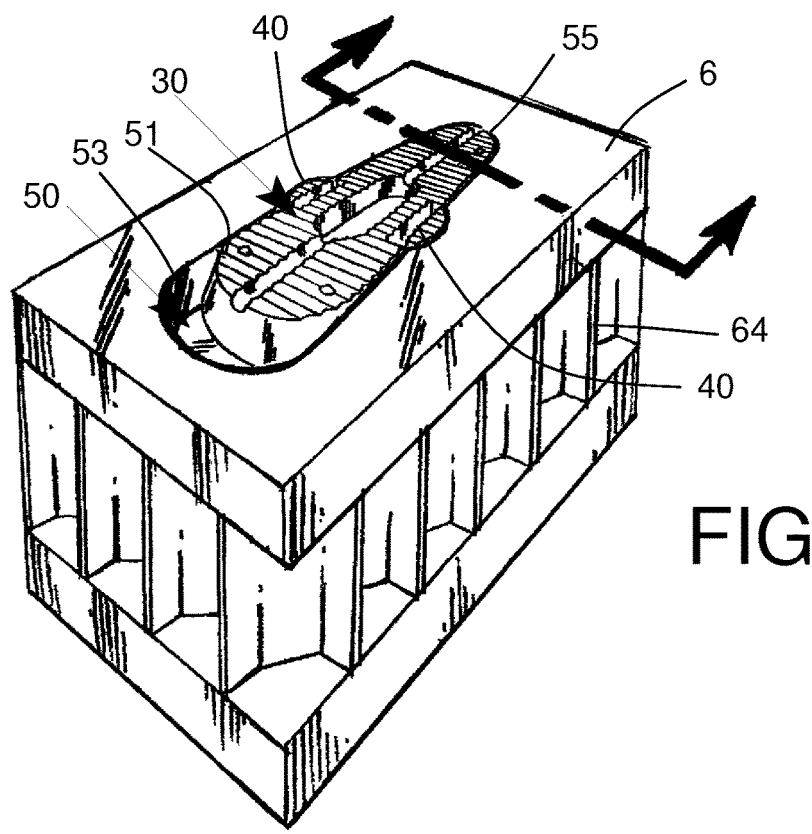
Figure 4F:
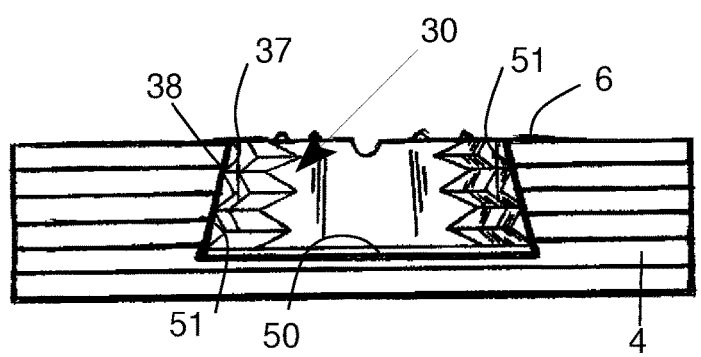
Figure 4G:
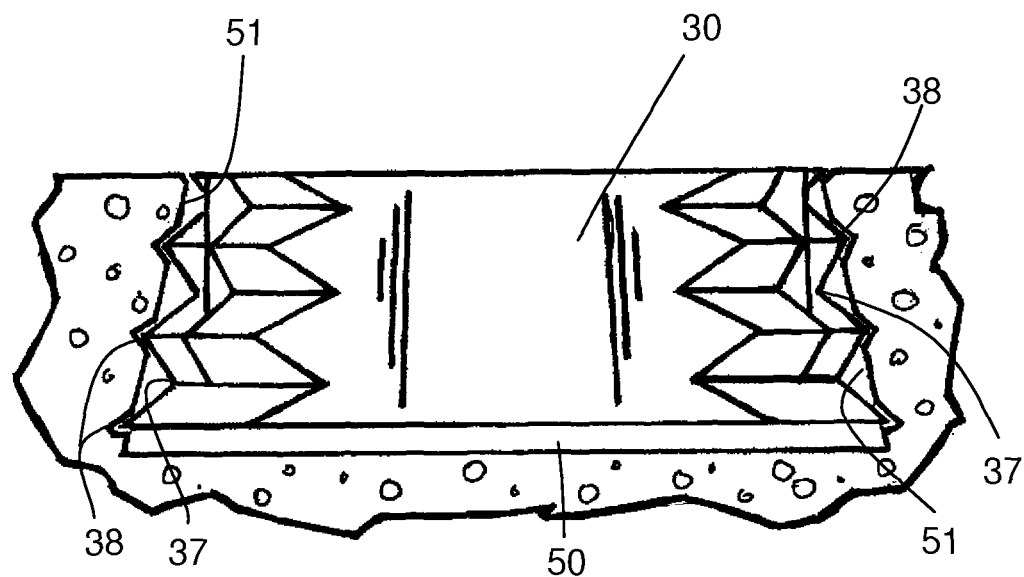
FIGS. 4G and 4H show alternative views of the deformation between the male connector and the sides walls of the recess when the male connector is wedged into the smaller end of the recess for a tight fit.
Figure 4H:
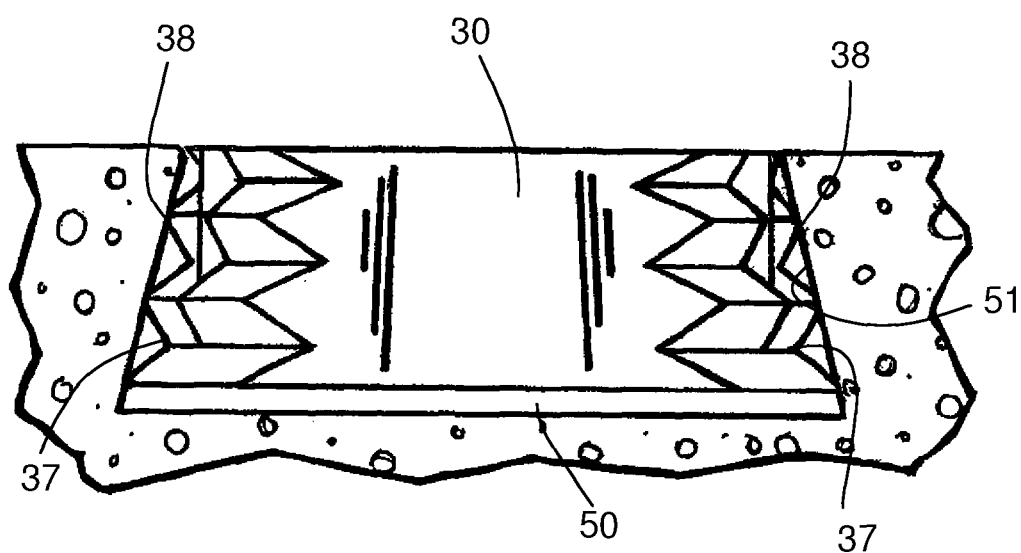

FIGS. 4G and 4H show the grip created between a male connector, such as connector 30 and the side walls 51 of a female connector recess 50. In FIG. 4G, the relatively harder protruding ribs 38 dig into the side walls 51.

The connector system 10 comprises a male connector, such as connectors 20 or 30, which can be inserted into a female recess or connector profile 50 that is relatively shallow. This allows use of the connector system 10 with composite materials used to form panels 2 and 4. FIGS. 3G, 4B and 4E show the use of this connector system with a panel having light weight hollow core. FIGS. 4C and 4F show its use with a solid panel. The relatively shallow depth of the female recess can be confined to a surface veneer, trim or strip that can be stronger than the inner core of these composite structures. This enhances the versatility of this connector system 10. The shallow depth also is important because the same connector system, and therefore the same size male connectors 20 or 30 can be used on either relative thin exterior panel faces 6 and relatively narrow panel edges 8 or trim strips.

FIGS. 5A, 5B, 6 and 7 demonstrate alternative approaches to mounting male connectors 20 or 30 on panel faces 6 or edges 8. FIG. 5A demonstrates two alternative means of mounting a male connector 20 on a panel edge 8. A mounting strip 70 is used to mount one male connector 20. Mounting strip 70 forms a dovetail connector along the panel edge 8, and slides into a dovetail slot from one end of the panel edge 8. A corrugated surface 71 on mounting strip 70 can engage corrugations 42 of the type previously depicted on male connector 30. An alignment groove 72, which could be either male or female as shown in FIG. 5A could engage a complementary alignment feature on the lower face of the male connector. The version of male connector 20, shown in FIG. 5A has an oblong mounting hole 29 so that small adjustments can be made in the position of the male connector 20 relative to the panel edge 8 with the complementary corrugations also allowing both adjustment and stability. Mounting strip 70 is located adjacent one end of panel edge 8, and the extra length provided by this dovetail mounting strip could prevent the panel edge 8 from fracturing when a male connector 8 needs to be positioned adjacent the end of a panel edge 8 or similarly adjacent an end of a panel surface 6. The second male connector 20 shown in FIG. 5A would be mounted conventionally by inserting a wood screw fastener 60 through the mounting hole 29 and directly into the panel edge 8.

FIG. 5B shows two other means for mounting a male connector 20 to a panel surface 6. A male connector 20, having two mounting holes 29 is shown exploded from the panel surface, and a partial section view below that connector shows how it could be mounted to a panel surface 6 by using rivet fasteners 60. This approach would allow male connectors to be mounted to a panel surface or veneer sheet 6 prior to assembly of a panel 2 with a honeycomb core. This approach would be suitable for mass production in an assembly line panel fabrication facility. A second double sided male connector 120 is also shown in FIG. 5B, and this type of connector will be discussed subsequently in more detail. This portion of FIG. 5B shows that only a female connector profile 50 is formed in the panel surface 6, and the male connector 120 is mounted inserted in this female connector profile 50. This approach could be suited for use with panels 2 having a thin veneer sheet that might be fractured by a standard fastener 60 or by the localized stresses placed on such a standard fastener when this panel is assembled to other panels or members. The female connector profile 50 would distribute these loads over a larger area.

Figure 6:
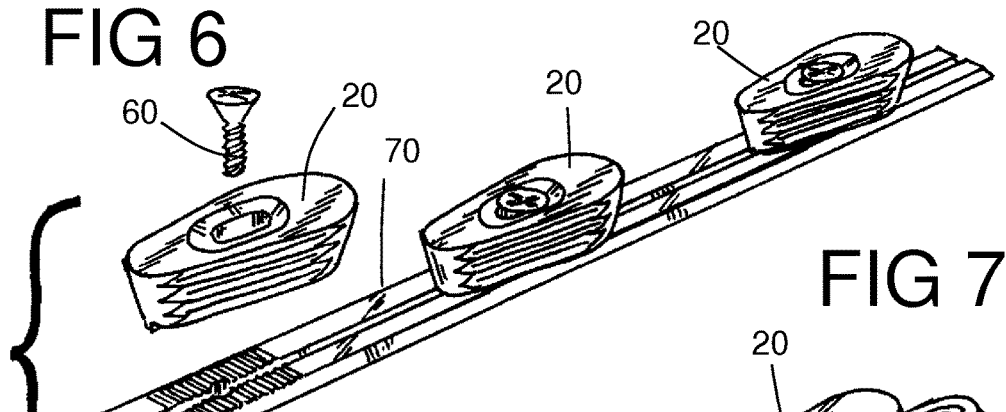
FIG. 6 shows how individual male connectors can be attached to a strip or rail that can then be mounted on a panel member in a ganged configuration.
Figure 7:
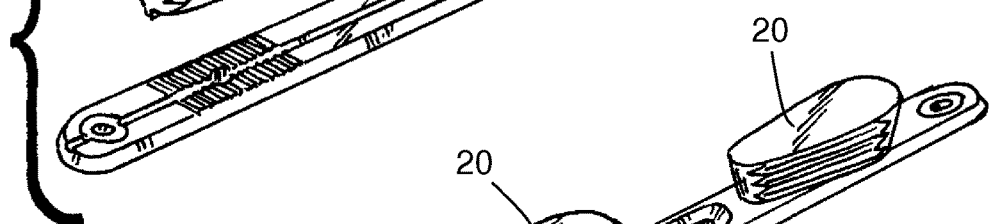
FIG. 7 is a view similar to FIG. 6 in which multiple male connectors are formed as part of a strip that is in turn mounted on a panel member.

FIG. 6 shows the use of a mounting strip 70, similar to that shown in FIG. 5A to mount a series of male connectors 20. A long strip of this type could be mounted in a dovetail slot on a panel surface 6 or a panel edge 8, but it could also be mounted directly to the exterior of the panel. The male connectors 20 shown in FIG. 6 would be attached to the mounting strip by conventional fasteners 60. FIG. 7 shows a similar approach, but in this case the male connectors 20 are fabricated integrally with the mounting strip 70 to form a one-piece structure. This one-piece structure could be molded.

Figure 8:
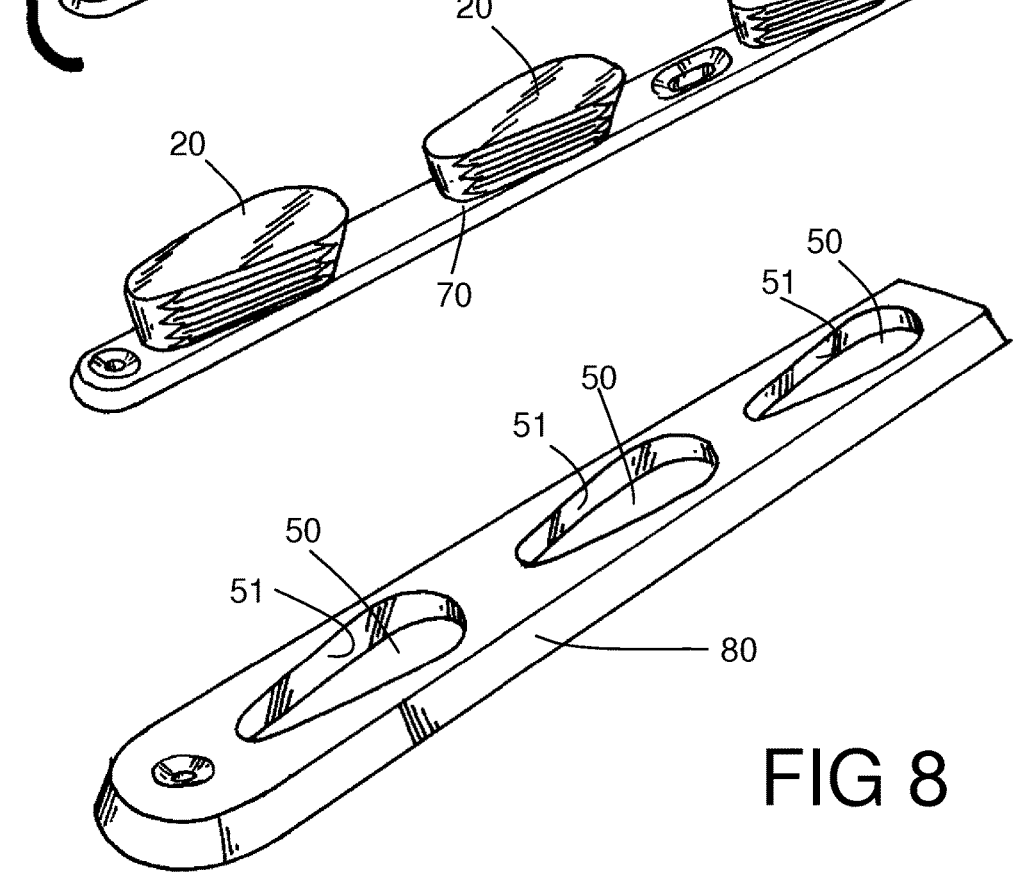
FIG. 8 shows a strip in which multiple female profiles are formed on the strip, which would then be attached to a second panel member.

FIG. 8 shows the use of another mounting strip 80 that has a series of female profiles 50 formed along its length. This female mounting strip 80 could be mounted in a dovetail slot formed in a member or it could be attached to the exterior of a panel surface or edge. Mounting strip 80 could be fabricated in different ways. For example, a plastic strip could be molded and a metal strip could be cast. Alternatively a metal female mounting strip 80 could be stamped and formed, and if necessary a coining operation could be employed to form the sloping sidewalls 51.

The connector system 10 would normally be employed by using a multiple male connectors and multiple female connectors to attach a first panel or member to a second panel or member. FIG. 9 shows multiple male connectors as they would be inserted in multiple female connector profiles along a panel edge 8. For purposes of illustration, the panel edge to which the male connectors are mounted is not shown in FIG. 9. Two different types of male connectors 20 and 30 are however employed in this configuration. Two male connectors 30, with locking tabs 40 are shown. The other two male connectors are male connectors 20 that do not employ locking tabs. However, since all of these male connectors 20 and 30 would have been mounted on the same panel member, locking tabs on all of the male connectors may not be necessary. If one male connector 30 is inserted sufficiently for its locking tab 40 to be fully deployed, the other male connectors 20 or 30 attached to the same panel member should also be fully inserted. Starting from the top in this view, the second and fourth connectors 30 both have fully deployed locking tabs 40, so if one is fully inserted, then the other male connector 30 would be fully inserted as well as the other two male connectors 20 without locking tabs. The third male connector 20 is mounted in a female connector recess that has side notches 56, even though that connector does not have locking tabs. The first male connector 20 is mounted in a female connector recess that does not have side notches. Although not shown, a male connector 50 with locking tabs could still be inserted in a female recess 50 without side notches, although in this instance, the tabs would not lock the male connector 50 in place.

FIG. 10 shows another version of a male connector 130 that includes the features of male connector 30. However, male connector 130 has multiple mating profiles in a stacked configuration. Similarly male connector 130 would be mounted in a female connector recess 150 that also has multiple mating profiles. In FIG. 10, three male profiles are formed. The top male profile is substantially the same as a male connector 30, but it includes a mating feature that would allow the other two male profiles to be snapped to it and would extend from the rear of the top male profile. An alternative version of this type of connector would be a strip of integrally molded male profiles that could be detached to fit a specific application. For instance, a notch could be molded between male profiles so that adjacent male profiles could be broken along this notch.

FIGS. 11A and 11B depict another configuration in which male connectors 20 could be joined together in a back to back configuration to assemble two panels in which only female profiles would be formed in both panels. Attaching two male connectors 20 back to back would result in a doubled sided male connector 120 as shown in FIG. 5B. Alignment keys and slots are shown for these male connectors 20. Alternatively, the double sided male connector 120 could be fabricated as a one-piece member.

Modified versions of male connectors are shown in FIGS. 12-16. Each of these versions function in a manner similar to the previously discussed male connectors. FIG. 12 shows a male connector 20 with the exception that this version does not include fluted sides. This connector 20 could be employed where it is necessary to use a thinner male connector to fit within a thinner female connector profile. An oblong mounting slot 29 allowing side to side adjustment is also shown in this version, but a mounting slot 29 of this type could be used with other male connector versions. Although the male connector 20 shown in FIG. 12 does not employ fluted sides, there are other means for obtaining the wedging and stabilizing action of the fluted sides. One approach would be to introduce a grit or granular material between male connector and the female connector profile. This grit or granular material could be deposited in the female profile and when the male profile is wedged into place, the grit or granular material would wedge between the male connector sides and the female connector side walls to hold the connectors in place. Alternatively the grit or granular material could be mixed with a polymer binder, which could be deposited on the male connector during manufacture. The polymer binder could be viscous, but when stressed as the male connector is inserted into the female connector profile the polymer binder would be extruded into and left behind in the entry cavity. The grit or granular material could be trapped between the sides and side walls as the viscous polymer material is extruded out, and this grit or granular material would dig into the sides and side walls anchoring them in place.

FIG. 13 shows an alternative version of male and female connectors with curved sides and sidewalls. Male connector 220 has a generally circular or rounded rear end 226 which would fit within a similarly rounded entry end 254 of the female connector profile 250. This configuration would aid initial alignment, although it would be wider than other versions. FIG. 13 also demonstrates that the shape of the male connector and corresponding female recess can correspond to the unusual shape of the members to be joined and by the requirement that the connection be as strong as possible. Designing the connectors to be as large as possible for the particular shape could require following the outline of the members, leaving enough wall thickness around the perimeter of the member in which a female recess is formed.

FIGS. 14A-14B show another version in which the male connector is similar to male connector 20 with the exception that a large bulbous chine 45 extends around the base of the male connector 45. This chine 45 would fit within a curved, peripheral incision 57 formed along the base of the female connector profile 50. This curved incision 57 could be formed by using a router with a spherical cutting edge as shown in FIG. 14A.

FIGS. 15 and 16 show another version of a male connector in which a dowel 62 could be employed instead of the screw fasteners shown in other embodiments. FIG. 15 shows a configuration in which one dowel 62 would be used to mount a male connector 20 to a panel member, and FIG. 16 shows a version using two dowels 62 for enhanced stability.

Figure 17:
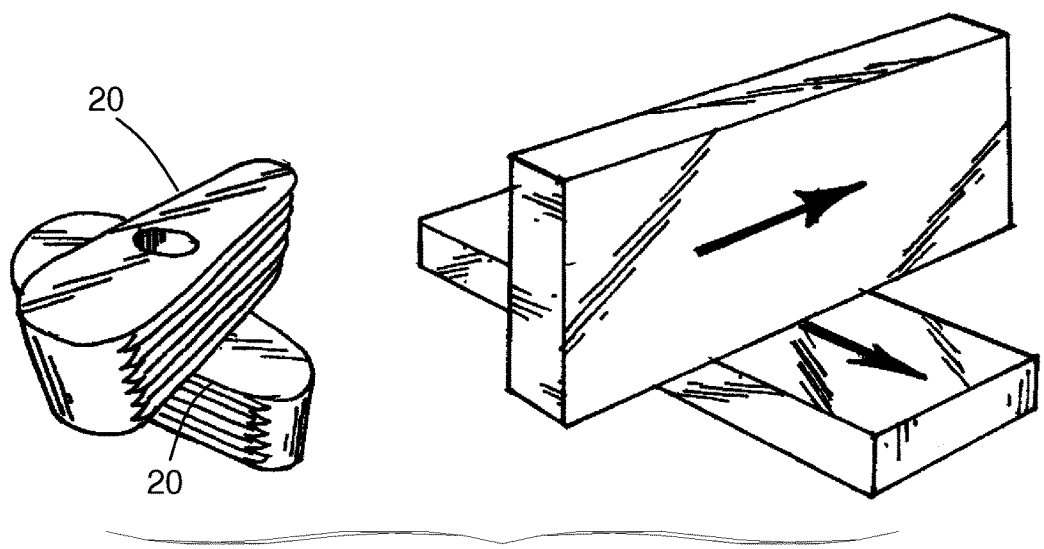
FIG. 17 shows a version of the connector system in which oppositely oriented male connector sections are joined so that panels extending transversely could be attached by using this single male connector version.
Figure 18:
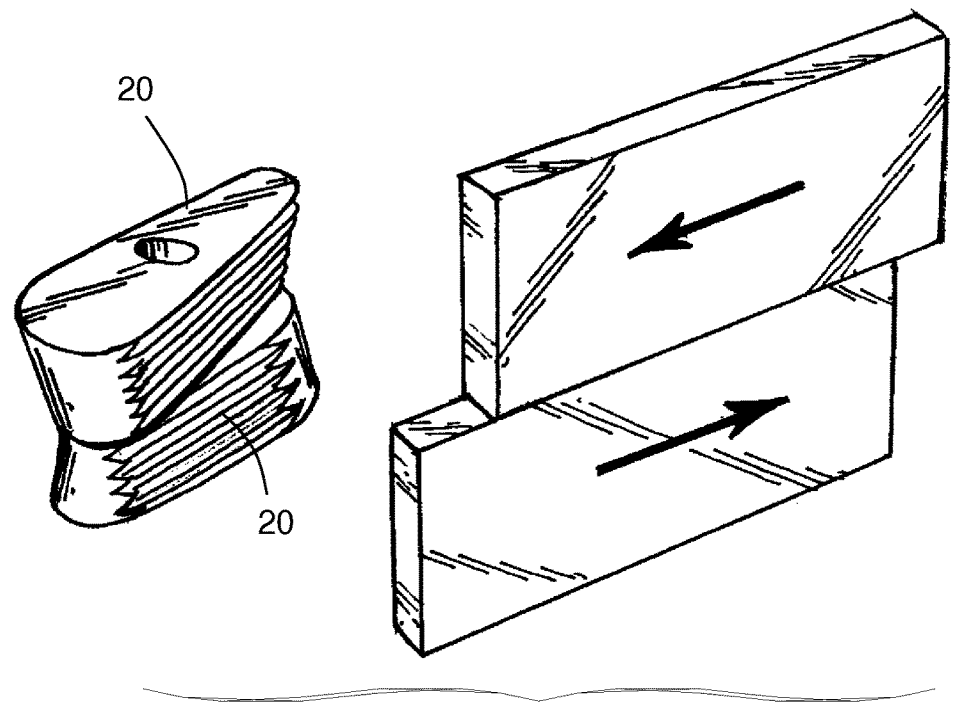
FIG. 18 is a view in which oppositely facing male connector sections are joined together so that they can be inserted into female profiles extending in opposite directions on two panel members.

FIGS. 17 and 18 show additional versions of double sided male connectors of the types shown in FIGS. 11A and 11B. FIG. 17 shows a version in which two male connectors 20 could be attached to each other so that a first panel 2 extending in one direction could be attached to a second panel 4 extending in a transverse direction. Both panels 2 and 4 would include female connector profiles extending transverse to each other when the panels are assembled together. FIG. 18 shows two attached male connectors 20 extending in opposite directions. With this configuration, one male connector 20 could be inserted into a first panel by relative movement in one direction and then the second panel could be attached by movement in the opposite direction.

FIGS. 19A-19D show a configuration in which male and female connectors in accordance with this invention can be incorporated into trim or edging pieces that can be employed in fabricating composite panels. As shown in FIG. 19A, panels 90 are of composite construction with surface veneer 91 enclosing a composite or partially hollow core. Trim strips 92 and 93 will form the edges of these composite panels. In one embodiment, these trim strips can be molded from the same plastics that would normally be used to fabricate such composite panels 90. Female connector profiles or recesses 94 are formed in trim strips 92 and male connector profiles 95 are formed in trim strips 93. It should be understood that panels 90 can be constructed with different configurations of male and female profile strips 92 and 93. For example, panels 90 could have male profile strips 93 along each edge and other panels could employ only female profile strips 92. Different combinations would be possible for different applications. Panels of this type can be formed with an internal lattice of sheets 96 and gaps 97 can be formed to allow space for female connector profiles 94 as shown in FIG. 19C. FIG. 22D shows how panels 90 can be joined by the connector profiles on these trim strips.

Figure 20:
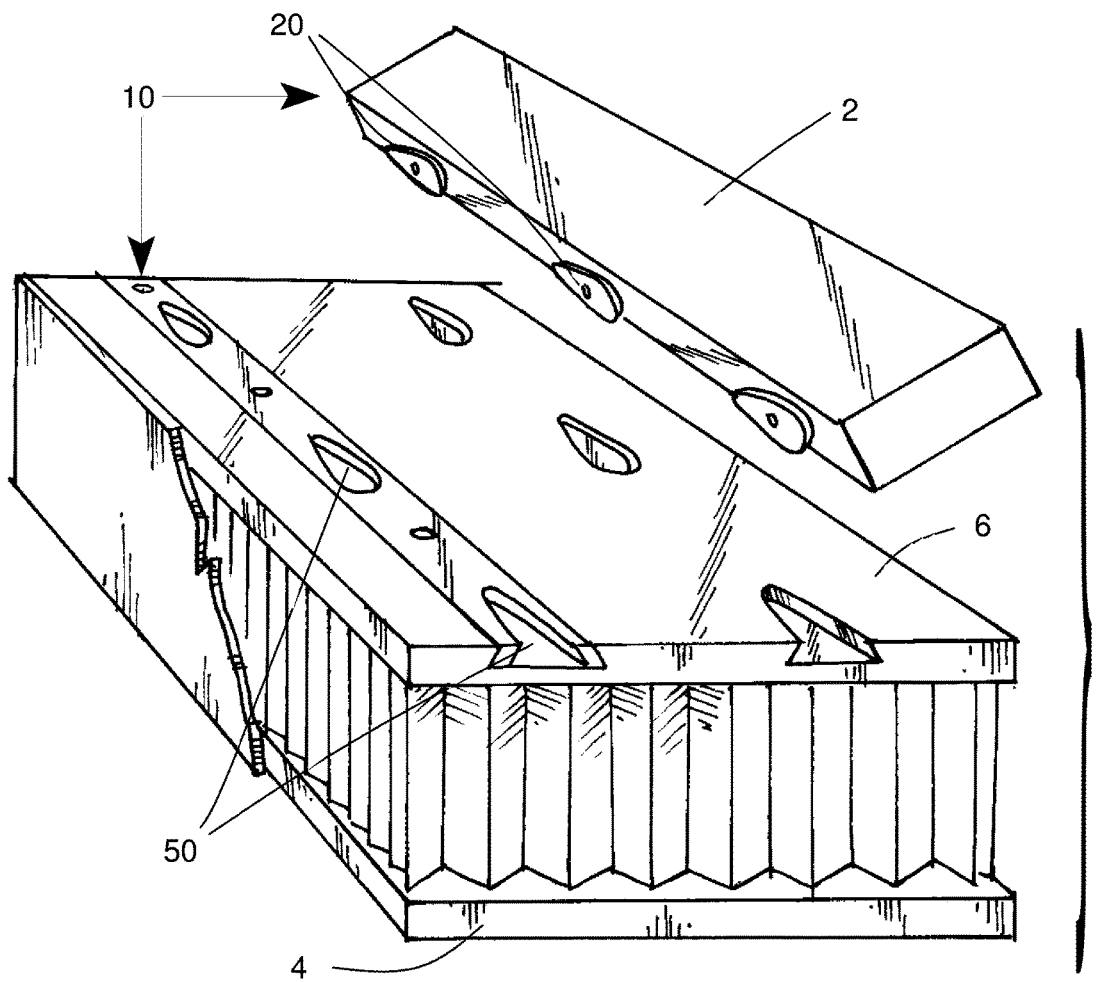
FIG. 20 shows two panel members with strips of male and female connectors mounted on the panels
Figure 21:
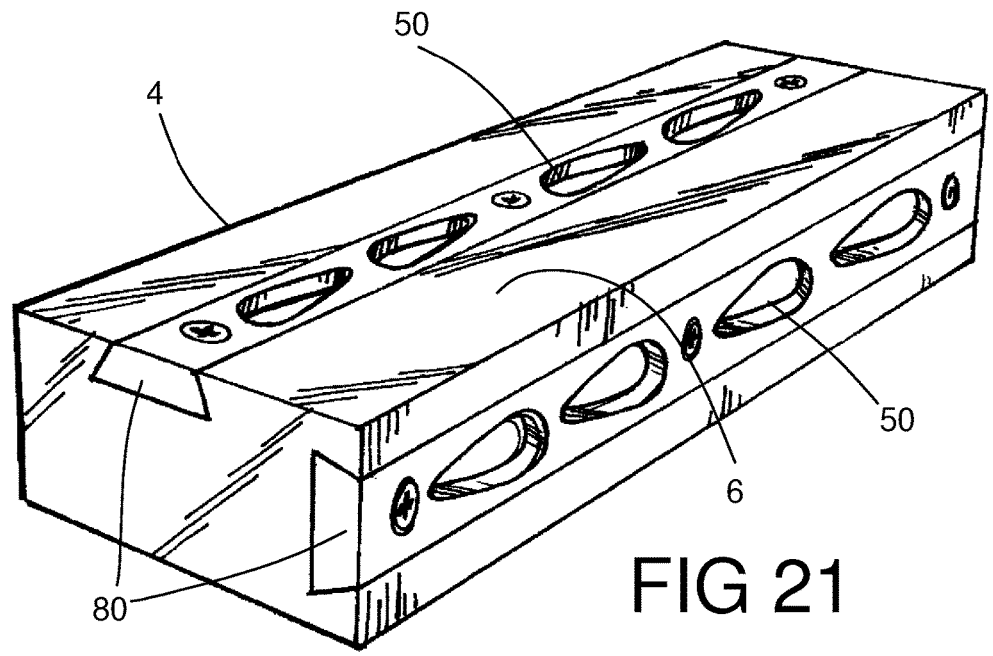
FIG. 21 shows a strip of female connectors mounted on a panel member.

FIGS. 20-25 show representative examples of the use of the connector system 10 to assemble panels. It would be understood by one of ordinary skill in the art that these examples merely show some of the types of structures that can be assembled using the connector system 10. FIG. 20 shows how a first panel 2, with male connectors 20 along a panel edge 8 can be used to mount the first panel perpendicular to a second panel 4 in which female connector profiles are located on one of the panel faces 6. The use of dovetail mounting strips for female connectors 50 and the formation of female connectors 50 directly in the panel surface 6 is shown in FIG. 20. FIG. 21 shows a more detailed view of the female connectors 50 in a dovetail mounting strip 80.

Figure 22:
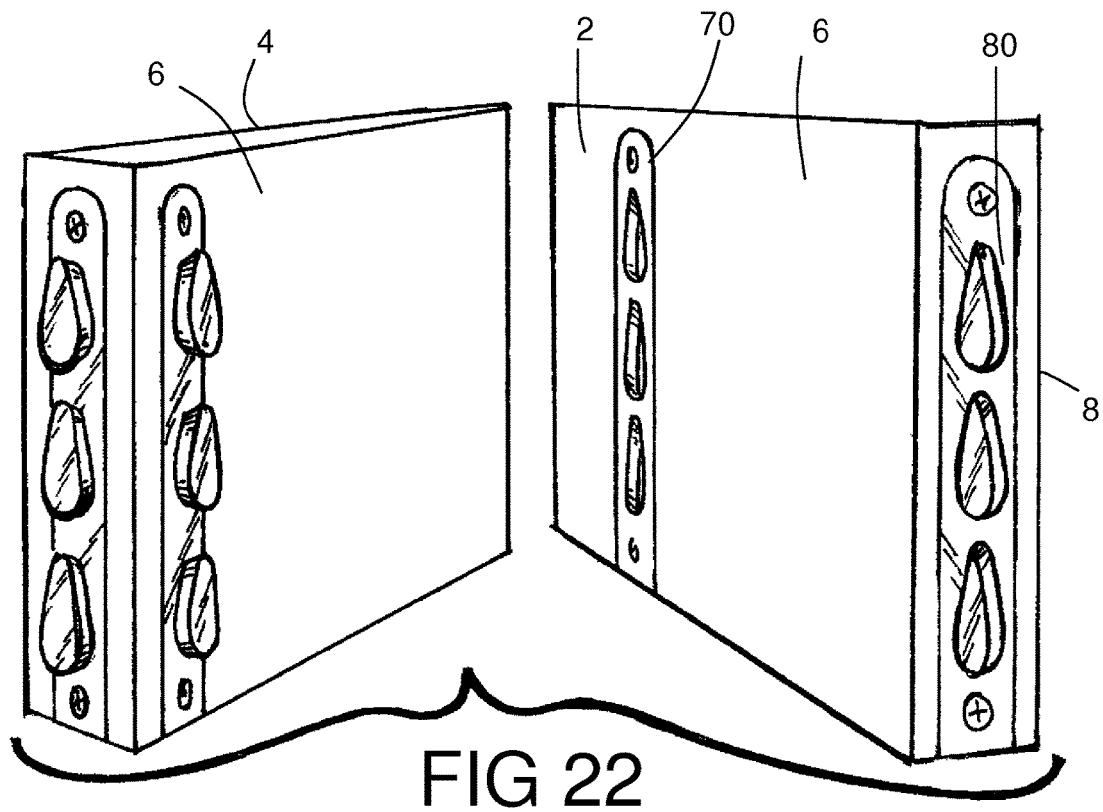
FIG. 22 shows two panel members that can be attached with opposed faces of the panel members abutting.

FIG. 22 shows a configuration in which a male mounting strip 70 is attached to a surface 6 of a first panel 2 with a female mounting strip 80 along and edge 8. A female mounting strip 80 on a second panel 4 can be attached to the male mounting strip 70 on the first panel 2. When assembled in this manner the two panels 2 and 4 would from a laminate.

Figure 23A:
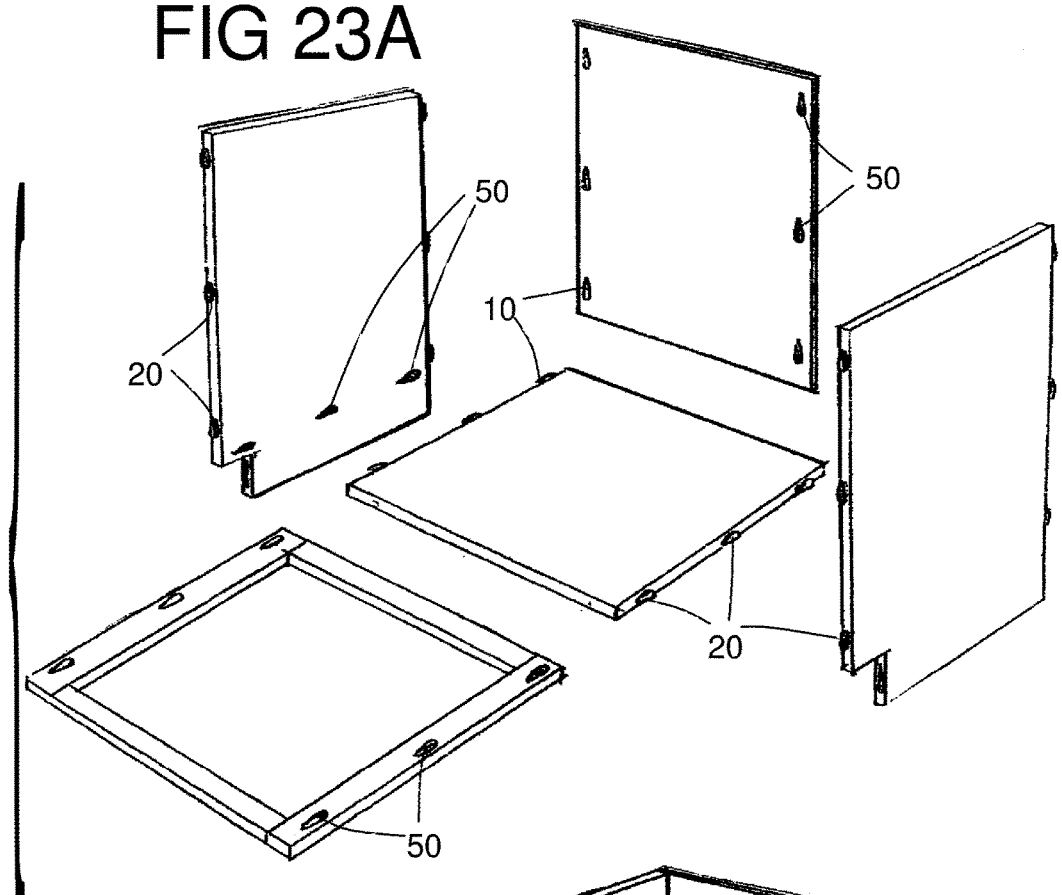
FIGS. 23A and 23B shows the manner in which a simple cabinet can be assembled using this connector system.
Figure 23B:
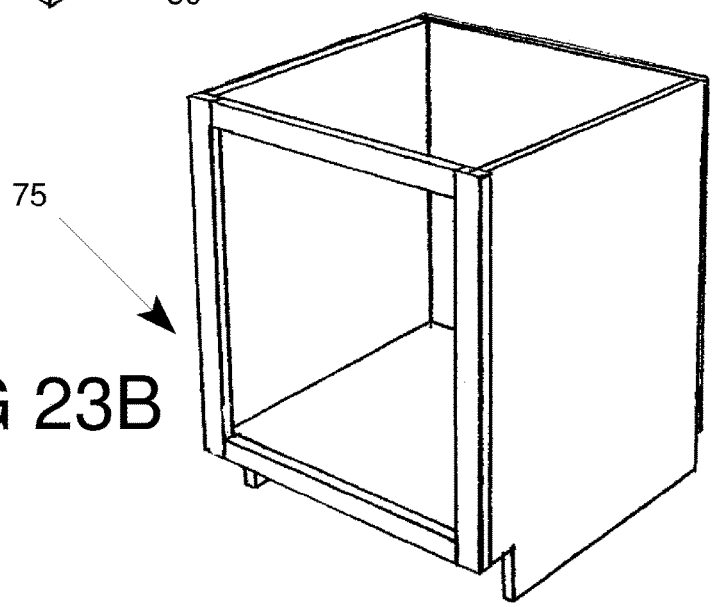

FIGS. 23A and 23B show the manner in which connector system 10 can be employed to assemble a simple cabinet 75. Male connectors 20 are mounted along the edges of four panels Female connector profiles 50 are located on the faces of each of the side panels, and the side panels can be assembled to the back panel and to the bottom panel. Female connectors 50 on a front frame can be attached to forwardly facing male connectors 20 on the front edges of the side panels. In assembling each panel to another, the male connectors 20 are first aligned with the entry end of the female connectors. As shown here, three male connectors would be aligned with three female connectors on the other panel member. After male connectors 20 are fully inserted into the entry end of the corresponding female connector profiles 50, a force will be applied to slide a first panel relative to the second panel until the male connectors 20 are wedged into the narrowing, tapered section of the female connectors to form a tight fit. This complete assembly process does not require the use of any tools.

Figure 24A:
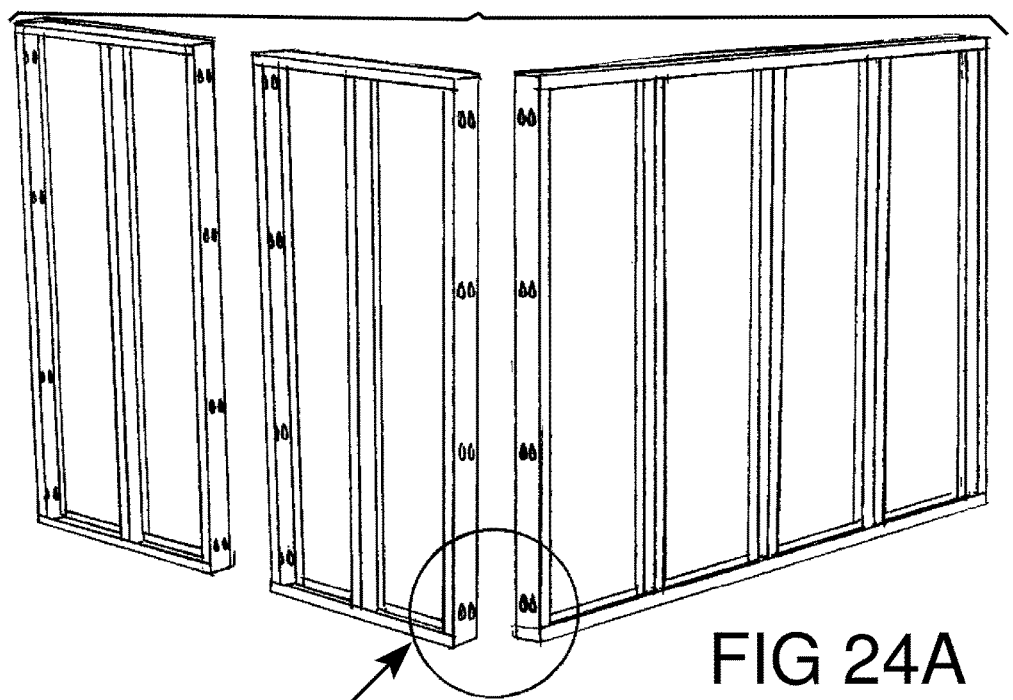
FIGS. 24A and 24B show the manner in which these connectors can be used to erect stud walls.
Figure 24B:
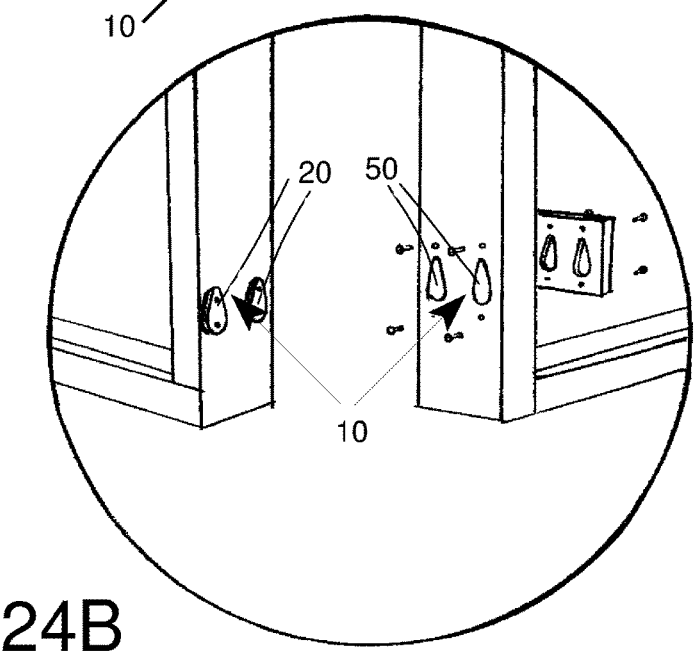

The connector system 10 can also be used to assembly stud walls as shown in FIGS. 24A and 24B. When used for this purpose, male and female connectors can be mounted in two side by side rows on 2×4 studs for addition strength. All that is necessary to join the male connectors to the female connectors is to position a stud wall section with protruding male connectors in an upright position and then lift the stud wall section with female connectors a small amount to initially align corresponding male and female connectors. The stud wall section with female connectors can then be allowed to move down, mostly under its own weight, to wedge the male connectors home in the female connector profile. When fully seated the mated male and female connectors will not allow the mated stud wall sections to be pulled apart. This secure connection is the same as with other uses of the connector system 10.

Figure 25A:
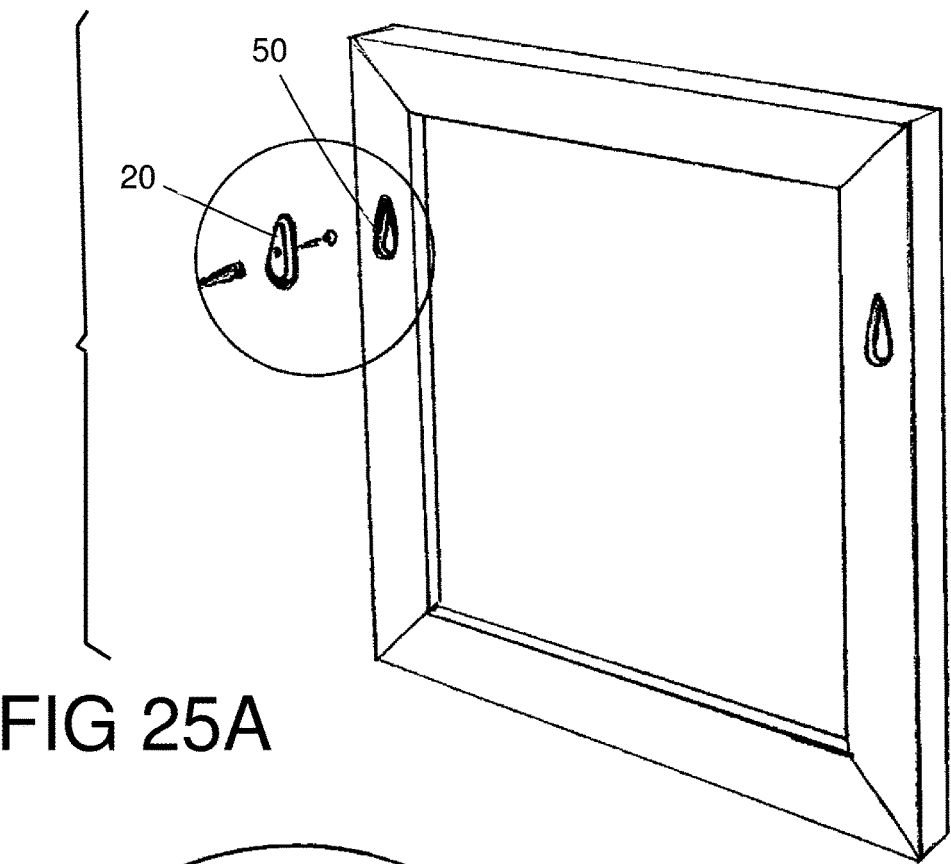
FIGS. 25A and 25B show the manner in which these connectors could be used to mount a frame or a decorative accent to a panel or a wall.
Figure 25B:
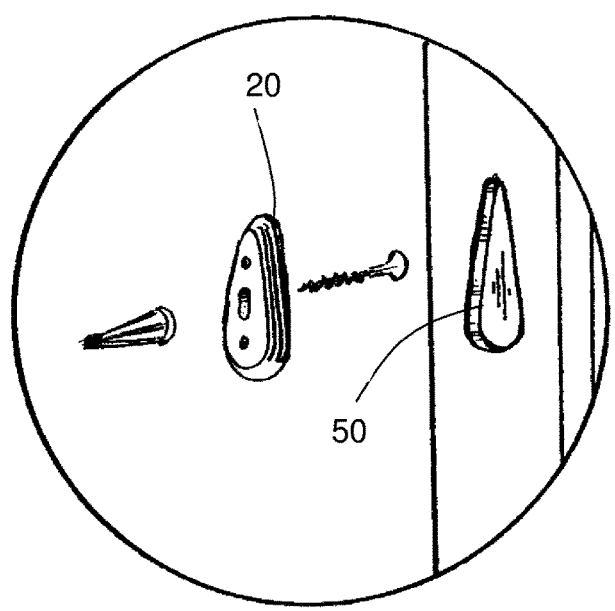

FIGS. 25A and 25B shows another use of the connector system 10. Here a frame is mounted on a wall or other partition by using the connectors system. FIG. 25B shows that an anchoring system suitable for drywall panels can be employed to secure the male connector to a wall. It should be understood that this approach can also be used to attach decorative members on the exterior of assemblies, such as cabinets or counters.

An important aspect of this invention is that the female connector profile with tapered sidewalls 21 can be easily fabricated. FIGS. 26A and 26B shows the manner in which a conventional routing tool can be used to cut the tapered female profile 50. The outwardly slanted cutting edges of a router bit will cut the side walls 51 forming an overlying lip around the routed female profile 50. Side notches 56 can also be formed as part of the movement of the router bit. This overlap will provide space for the diverging sides 24 of a male connector to fit within the overlap so that the male connector cannot be pulled perpendicular to the floor 52 of the female connector profile 50. The side walls 51 also provide sufficient surface area so that the sides 24 of the male connector will be in intimate contact where the fluted sides 24 will anchor the wedged male connector 20 so that it cannot be pulled out of the narrow portion of the female connector profile 50. A CNC controlled router can efficiently cut female profiles in panels in a manufacturing environment. Of course the fact that the female connector profile is easily cut by use of a router bit, does not mean that alternative means for forming such a profile could not also be employed.

Another configuration of a connector system 300, including a female connector profile 310 and a male connector 320, is shown in FIGS. 27A-33B. The side walls 313 of the recessed female profile 310 converge from an open end 311 and an opposite closed end 312. In this configuration, the opposite sides 324 of the male connector 320 will converge from the trailing 328 end to the male connector leading end 327. As with the other versions, multiple male connectors 320 can be positioned on one component panel and multiple female profiles 310 can be similarly positioned on the other component or panel, and the two panels or components can be assembled by mating all male connectors 320 in their corresponding female profiles 310. Multiple male connectors 320 can be located in a straight line and multiple corresponding female connectors 310 would also be positioned in a straight line.

Figure 28A:
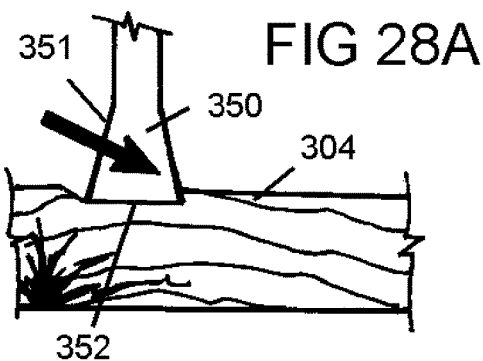
Figure 28B:
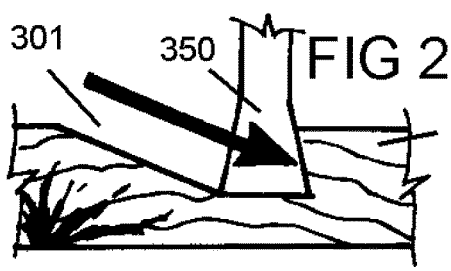
Figure 28C:
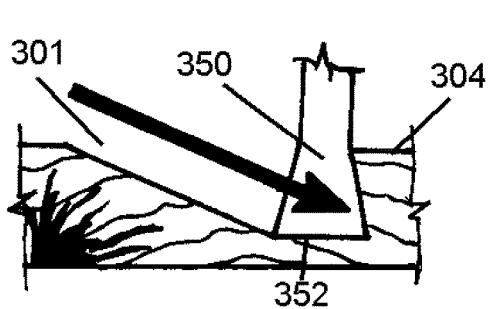
Figure 28D:
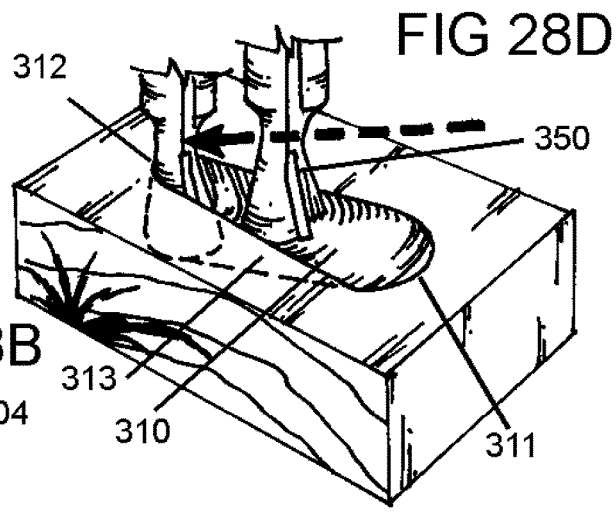
Figure 28E:
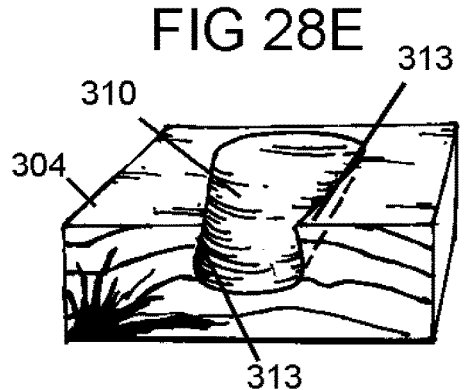
Figure 28F:
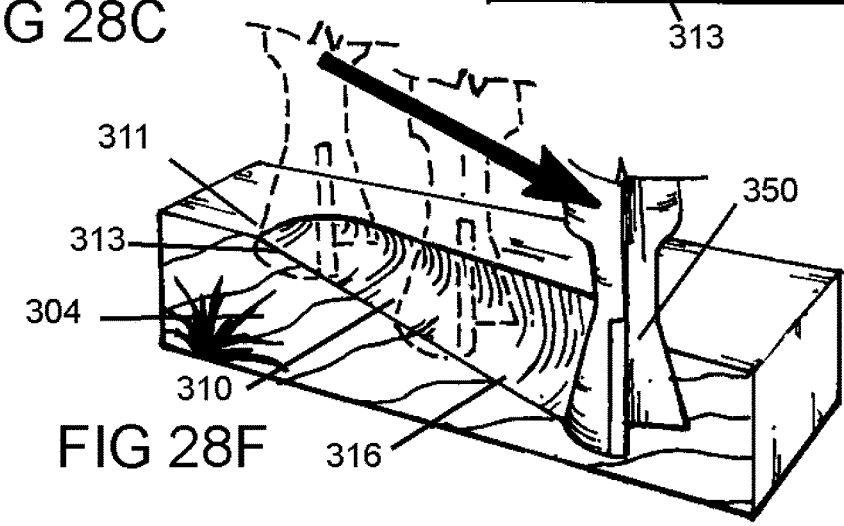

One way of forming the recessed female profile 310 of this second configuration is to use a conical router bit 350 following a closed path. Although other means for fabricating this recessed female profile 310 can be employed, its structure is more readily understood by referring to this method of manufacture. In this configuration as shown in FIG. 28G, the router bit 350 will follow a triangular path beginning with a first position adjacent the open end 311 of the recessed female profile 310 to be formed. The router bit 350 will then follow a path 354 that is inclined relative to two perpendicular planes, with a projection as represented by the arrow in FIGS. 28A-28C. The conical router bit 350 will then follow a straight path to a second position at which the closed second end of the recessed female profile will be formed. The conical router bit 350 will then follow another straight line path to a third position, spaced from the first or beginning position. As shown in FIG. 28G, the path from the first to the second position will be at an angle relative to the path from the second position to the third position. To complete the formation of the recessed female profile 310, the router bit 350 will follow a final segment from the third position to return to the first position. The closed path followed by the router bit 350 will thus be triangular. The path and the planform of the resultant recessed female profile is shown in FIGS. 28A-28G.

Since a conical router 350 will have a finite diameter at its widest point, such a router bit 350 will cut surfaces extending beyond this triangular close path forming a smooth surface. A lip 314 with inwardly directed mating surfaces 316 will be formed along the sidewalls 313 of the recessed female profile 310, and these sidewalls 313 will converge from the open end 311 to the closed end 312. The companion male connector 350, shown in FIGS. 29A-29I, will have sides that diverge from the male connector leading end 327 to the male connector trailing end 328.

A more geometric definition of this recessed female profile 310 can refer to a conical generatrix and its path or directrix. With the exception of a relief groove for ejecting material., a conical router bit 350 can be considered to be a manufacturing tool having essentially the same shape as this conical generatrix. The generatrix will follow a path such that movement of the generatrix, like movement of a conical router bit 350, will result in removal of all of the material within a recessed female profile 310. This generatrix will form the peripheral shape of the recessed female profile 310 as it follows a closed directrix or path, which in general will be triangular. Unlike the previous embodiments, the directrix or path followed by this conical generatrix will be inclined relative to the plane of a component or panel 304 in which the recessed female profile 310 is defined. In an initial position the conical generatrix is positioned with the axis, defining its conical surface, generally perpendicular to the panel exterior surface 305 or first plane into which the recessed female profile will extend. This axis will remain perpendicular to this exterior surface 305 throughout the movement of the conical generatrix. The conical generatrix will, however move along an inclined directrix or path into the panel or relative to this first plane. This inclined directrix will have a projection in the plane of the panel 304 exterior surface as well as in a plane perpendicular to this exterior surface and to the axis defining the generatrix conical surface. The base or lower face of the generatrix like the base or lower surface 352 of a conical router bit 350 will have a generally circular periphery. Since the diameter of the conical generatrix deceases as the distance from this larger lower face increases, the width of the recess defined by narrower sections of the generatrix will be less than the width defined by portions of the geneartrix having a relatively larger diameter. Thus an overlying, inwardly facing, angled surface or lip 314 will be formed as the generatrix moves from an initial position to a final position. The initial position of the generatrx will generally define the open end 311 of the recessed female profile 310. The width of this lip 314 will be greater at the closed end 312 of the recessed female profile 310 than adjacent its open end 311, where the lip 314 will essentially vanish. Since the generatrix, like the router bit 350 moves along an inclined path, deeper into the panel 304 as it moves from the initial positon to the final position, the female profile 310 and the lip 314 will be deeper at the closed end 312. The height or depth of this lip 314 will also be greater. As noted in FIGS. 28A-28C the constant orientation of the axis of the conical genertrix means that the periphery of the lower face of the conical generatrix will also cut into the panel 304 to form a curved lower portion of the female profile 310, until movement of the conical generatrix stops at the closed end 312. When the generatrix reaches this final position a circular lower surface 317 will be formed at the closed end 312. The overlying angled surface or lip 314 formed by this movement of the generatrix or router bit 350 will thus slope downwardly from the female profile open end 311 to the closed end 312. The side walls 313 of the lip 314 will extend from the open end 311 to the curved portion of the lip 314 at the closed end 312, and these elongate sidewalls 313 will progressively protrude further toward the centerline of the recess formed by this action of the conical generatrix. As shown in FIG. 27F these sidewalls 313 are curved due to the action of the conical generatrix as it moves along its inclined path. This overlying lip 314 will engage a corresponding male connector 320, with its counterpart shape, as it is inserted into the recessed female profile 310.

The generatrix will follow a generally triangular path, or directrix to form a converging recessed female recess 310. The conical generatrix will move from a first position to a second position, which will comprise the closed end 312 of the recessed female profile 310. The conical generatrix will then move from the second positon to a third position along a portion of the closed path or directrix, which extends at an acute angle relative to the path of the geneatrix extending from the first to the second position. The second position will be adjacent to the first position, and movement of the conical generatrix to from the third to the first position will complete formation or definition of the converging recessed female profile, as shown in FIG. 28G.

In this embodiment, the male connector 320 mating with this recessed female profile 310 will be substantially flush with the recessed female profile 310, as can be seen in FIGS. 27E and 27F. Thus the shape of the male connector 320 can be considered to be formed by this movement of a conical generatrix, although it shape will be the convex conjugate of the generally concave recessed female profile 310.

The exterior surface of the male connector 320, when fully seated, will conform to the interior shape of this recessed female profile 310 from the vicinity of the open end 311 to the closed end 312 of the recessed female profile 310. The male connector 320, as shown in FIGS. 28A et seq. is in the shape of a nose 325 at it leading end or prow 327 and extends to a shallower trailing end 328. Two elongate opposite sides 324 extend from the curved leading end 327 to the trailing end 328 of the male connector 320. The male connector sides 324 can be curved to conform to the curved side walls 313 of the recessed female profile 310. An inclined, outwardly facing mating face 326 is also formed around the periphery of the male connector 320 along both converging sides 324 and around the curved leading end 327. This inclined and upwardly facing mating face 326 will fit within and beneath the lip 314 or overlying downwardly or inwardly facing surface 315 of the recessed female profile 310 when mated. The width and height of this inclined, upwardly or outwardly facing mating face 326 will progressively increase from a minimum adjacent the trailing end 328, along both sides 324 to a maximum at the center of the curved leading end 327 of the male connector 320. The connector body has opposite sides extending between the outer face and the inner face. The sides 324 of the body are inclined between the outer and inner faces 329 and 323 so that the outer face is smaller than the inner face, The opposite sides 324 of the body also converge toward a forward or leading end 327 of the body so that the forward end of the body is narrower than a rear or trailing end 328 of the body. The opposite sides 324 are engagable with side walls 313 of the converging female profile 310 having a converging footprint in the second component to mechanically attach the first component 302 to the second component 304.

The lower or outer face 329 of the male connector 320 is inclined from its trailing end 328 toward the leading end 327. A circular, generally flat portion 330 of the male connector lower surface 322 extends from the leading end 327 to the inclined portion of the male connector lower face 322. This generally flat circular portion 330 will be generally flush with the circular section 317 of the recessed female profile 310 that will be formed at the final stage of movement of a router bit 350 forming the recessed female profile 310. The recessed female profile 310 may be formed by means other than the use of a conical router bit 350, and a flat circular section may not be present in female profiles 310 formed by other means. However the generally flat circular portion 330 of the male connector 320 will allow this version of the male connector 320 to fit into other recessed female profiles 310 that may be fabricated by other means.

The male connector 320 also includes a mounting portion in the form of a member or protrusion 331 extending from a generally flat upper face 323 of the male connector 320. This mounting portion 331 will fit within a compartment 340 formed in the first panel or first component 302 and the male connector 320 can be secured to the first panel or component 302 by the fit of the mounting protrusion 331 within the mounting compartment 340. An uneven surface may be formed on the exterior of the mounting protrusion 331 to ensure a tighter fit within compartment 340. The faces of the mounting portion 331 will diverge to fit within sloped compartment surfaces 341 to secure the male connector 320 to the first panel or component 302. The compartment 311, shown in FIGS. 34A-34D may also be cut with a conical router bit 360 to form the sloped or diverging compartment surfaces 341. The male connector mounting portion 331 can be inserted into a corresponding compartment 340 in a retracted state. The mounting faces or flexible arms 342 forming the exterior of the mounting portion 331 can be wedged into an expanded state during insertion into the compartment 340. Various means for expanding the mounting faces or flexible arms 342 will subsequently be described in more detail.

The recessed female profile 310 of this embodiment may be cut into a panel or component 304, such as a panel formed of wood or some other material. The male connector 320 is preferably molded or cast from a suitable material. In the preferred embodiments of this invention, the male connector is molded from a plastic. Other materials can also be employed.

Multiple male connectors 320 can be mounted in spaced locations along an edge of a first panel or component 302. Multiple recessed female profiles 310 can be routed or cut into an exterior surface 305 of a second panel 304. The first panel 302 can then be attached to the second panel 304 with the first panel 302 extending perpendicular to the second panel 304. This assembly technique can be employed in the assembly of panels into a representative piece of furniture or case goods.

As with other configurations and connector assemblies, an advantage of this configuration or connector system 300 is that the width of the male connector 320 will be significantly less than the width of the recessed female profile 310 during almost all of the travel of the male connector 320 during insertion into its corresponding recessed female profile 310. However, when fully seated the upwardly or outwardly inclined or tapered facing mating face 326 of the male connection 320 will be flush with the inwardly inclined or tapered facing surface 316 on the lip 314 of the recessed female profile 310. When fully seated, the largest portion of the mating face 326 of the male connector 320 will still be flush with the largest portion of the recessed female profile 310. However, during most of the insertion path the mating surfaces 316 and 326 will not slide along each other and there will be little if any resistance or sliding or frictional force developed between the two connecting members. Therefore the insertion force will be limited during almost all of the mating travel, thus making it easier to assemble two components or travel. The retention will not, however, be reduced and the joint formed between the two components or panel will be just as secure. This double tapered configuration of both the female profile 310 and the male connector 320 thus significantly improves assembly as well as disassembly of two components or panels 302 and 304 as well as assemblies containing multiple components or panels joined by the same connector system 300.

FIGS. 30A and 30B through FIGS. 33A and 33B show the movement of converging male connector 320 into a converging female profile 310 which together comprise the connector system 300. FIGS. 30A and 30B show respectively a top view and a side sectional view of the converging male connector 320 as it begins to enter of a corresponding converging female profile 310. The converging male connector 320 does not engage any female surface. The converging male connector 320 is moved along an inclined path partially into the converging female profile 310 in FIGS. 31A and 31B. Note, that the inclined bottom surface 329 of the male connector is shown sliding along the inclined upwardly facing surface 315 of the female profile 320. The tapered upwardly facing and protruding surface 326 on the leading end 327 and opposite sides 324 of the male connector 320 have not yet engaged the overlying surface 315 on the lip 314 of the female profile 310. Little if any insertion force would be developed at this stage. FIGS. 32A and 32B show continued movement of the converging male connector 320 into the converging female profile 310. The upwardly or outwardly facing surface 326 on the leading end 327 and sides 324 of the male connector 320 have just moved below the downwardly and inwardly facing lip surface 315 on the female profile, and still little insertion force is required. FIGS. 33A and 33B show full insertion of the converging male connector 320 into the converging female profile 310 with surfaces at the front and side of the male connector 320 abutting oppositely facing surface on the female profile 310. Little frictional force has been encountered during movement of the male connector 320 between the initial position shown in FIGS. 30A and 30B and the final position shown in FIGS. 33A and 33B, because the converging male connector 320 will be located between wider side walls 313 on the female profile 310 during most of its travel.

Male connectors 320 can be attached to a first panel or first component 302 so that they extend beyond the first panel or component 302. When used to connect panels 302 and 304, these male connectors 320 can be attached to side edges 306 of panel members 302. One simple way of attaching a male connector 320 to a panel edge 306 is to employ a standard fastener, such as a wood screw, that can be driven through the mating section of the male connector into the panel member. This is the same approach used on another embodiment as shown in FIG. 5A.

Attachment of male connectors 320 to panels or other components 302 with screws or other traditional fasteners will in certain situations be an effective means for mounting male connectors 32- to panels 302. However, this approach can require a certain level of skill so that the screw does not damage the panel member or component, and typically this approach may be more suited to a manufacturing environment, but not to ready to assembly items where components must be assembled by a customer. Screw fasteners also may not lend themselves to efficient manufacturing.

One of several alternative approaches to attaching a male connector 320 to a panel or other component 302 is shown in FIGS. 34A-34D. A slotted compartment 340 may be formed in a panel member 302 by using a router 360 as shown in FIG. 34A. After using the router to essentially drill a hole, the router bit can be moved from side to side to form a compartment with diverging side walls 341 as shown in FIGS. 34B-34D. The router can then be withdrawn through the original hole.

A toolless assembly technique for attaching a male connector 320 to a panel or other component 302 for subsequent mating with a recessed female profile 310 is shown in FIGS.

35A-35D. This approach employs a cam 335 mounted in a groove or slot 337 along the inner inclined face 329 of a male connector 320 and a wedge 332 attached to a cam follower 334. The wedge 332 extends through a mounting protrusion 331 and can expand that protrusion within a compartment 340 with diverging sidewalls 341. The cam 335, with an operable lever arm or actuator 336 fits within the mounting groove 337 and can be rotated between the retracted position shown in FIGS. 35B and 35C and an operative position shown in FIGS. 35D and 35E. The cam follower or pin 334 is at one end of an arm 333 and the wedge 332 at the other end. The end with the pin 335 can be inserted through a hole in the mating portion of the male connector 320 into the groove 337 in which the cam 335 is situated. In the retracted position, this pin or cam follower fits within a downwardly facing slot on the cam 335. In this position the mounting protrusion 331 and wedge 332 can be inserted into the compartment 340 cut into a panel member 302. When the cam 335 is rotated relative to the mating protrusion 331 the wedge 332 will be pulled up toward the cam 335 and relative to the diverging walls 341 of the compartment 340. When the cam 335 has been rotated to the position shown in FIGS. 35A and 35B, the flexible arms 342 in the mounting protrusion 331 will be wedged into engagement with the diverging compartment walls 341 and the cam 335, and its actuator handle 336 will be in a stable position within the groove 337 on the mating portion of the male connector 320. The cam 335 will not, however, protrude beyond the inclined bottom surface 329 of this male connector 320 in this operative position, and therefore the cam 335 will not interfere with insertion of the male connector 320 into a corresponding recessed female profile 310. The male connector 329 will be firmly attached to the panel or other component 302, but rotation of the cam handle or actuator 336 back to the retracted position of FIG. 35B will free the male connector 320 from the panel or other component 302. This toolless cam actuator mechanism is thus suitable for both factory assembly and for field assembly by an untrained person.

FIGS. 29A-29G show a male connector 320 with a mounting protrusion 331 joining a mating portion of the male connector 320. Since the male connector 320 can be molded, the mating portion and the mounting protrusion would typically be part of a one-piece plastic member.

FIGS. 26A and 36B show a version in which a simple fastener, such as a screw 432, extending through a hole in an alternate male connector 420 can be used to essentially permanently attach the male connector 420 to a panel or other component 302. Of course the male connector 420 can be removed from panel 302 by backing out the screw 432.

An alternative mounting mechanism is shown in FIGS. 37A-37C. A wedge 535 can be first positioned in the compartment 340 in the first panel or component and the mounting protrusion 331, with relief grooves formed therein can then be inserted into the compartment 340. The wedge or wedges can then enter the relief grooves as the mounting protrusion of the male connector is inserted into the compartment. The wedges will then deform the mounting section until it diverges along the ends so that it will be firmly wedged into the compartment and the male connector will be firmly attached to the first panel or component. This approach lends itself to both factory and field assembly, but the attachment can be considered permanent, so the item cannot be disassembled.

Another approach employing a wedge and an expandable mounting protrusion is shown schematically in FIG. 38. A screw can be inserted through the mating portion and mounting protrusion of a male connector into a wedge 632 previously inserted into a compartment with diverging sidewalls. As the screw is tightened a wedge received in the expandable mounting protrusion causes similar expansion to wedge the mounting protrusion tightly into the compartment. The male connector can be disassembled by reversing the screw.

Although especially suited for use in Ready to Assemble or RTA components and for field assembly and disassembly, these connector systems are also suited for factory installation. The various representative versions depicted herein are not the only embodiments in which this invention may be implemented and one of ordinary skill in the art could employ this invention in somewhat differing structures without departing from this invention. For example one of ordinary skill in the art might construct the male connectors and the female profiles as part of separate members that are each attachable to components or panels before the panel are attached.

I claim:

1. A male connector attachable to a first component for mechanically attaching the first component to a second component on which a converging female profile with inwardly diverging side walls is formed, the male connector being insertable into the converging female profile, the male connector comprising:

a body having an outer face and an inner face, and a mounting member, the body being attachable to the first component by the mounting member when joined to the first component, with the inner face abutting the first component;

the body having opposite sides extending between the outer face and the inner face, the sides of the body being inclined between the outer and inner faces so that the outer face is larger than the inner face, the opposite sides of the body converging toward a forward end of the body so that the forward end of the body is narrower than a rear end of the body, wherein the opposite sides are engagable with the side walls of the converging female profile having a converging footprint in the second component to mechanically attach the first component to the second component;

wherein the forward end of the body between the opposite sides is inclined from the outer face toward the inner face and wherein the body has a thickness between the outer face and the inner face that is greater at the forward end than at the rearward end.

2. The male connector of claim 1 including at least one rib protruding from each of the opposite sides between the outer and inner faces of the body.

3. The male connector of claim 1 wherein the body of the male connector has an exterior shape confirming to an interior shape of the converging female profile on the second component.

4. The male connector of claim 1 wherein the mounting member is insertable into the body for attaching the male connector to the first member.

5. The male connector of claim 1 wherein the mounting member extends from the body and is insertable into the first component.

6. The male connector of claim 5 wherein the mounting member is outwardly flexible when engaged by a wedge upon insertion into a compartment in the first component.

7. The male connector of claim 6 wherein a cam on the male connector, when actuated, wedges flexible arms on the mounting member outward upon rotation of the cam relative to the body to secure the mounting member within the compartment.

8. The male connector of claim 1 wherein the mounting member comprises a fastener, separate from and engagable with the body and the first component.

9. The male connector of claim 1 wherein the forward end of the body is curved between the opposite sides.

10. The male connector of claim 1 wherein the rear end of the body between the opposite sides is also inclined between the outer face and the inner face.

11. A connector system for attaching first and second components together, the connector system comprising;
   a male connector and a female profile, the male connector being mountable on the first component to protrude from the first component and the female profile being formed on the second component;
   the male connector having a tapered body with an inclined forward end narrower than a rear end and with inclined sides extending between an outer face and an inner face so that the outer face is wider than the inner face and wherein a forward end of the tapered body between the inclined sides is inclined from the outer face toward the inner face and wherein the tapered body has a thickness between the outer face and the inner face that is greater at the forward end than at the rearward end;
   the female profile comprising a tapered recess converging from an open end to a closed end forming opposite converging side walls that are also inclined relative to an exterior surface of the second component so that a narrowest section of opposite converging side walls is on the exterior surface of the second component;
   wherein the inclined sides of the male connector engage the inclined converging side walls of the female profile when the male connector is inserted into the female profile, and
   wherein the tapered body is laterally shiftable relative to the tapered recess upon lateral movement of the first component relative to the second component to position the forward end of tapered body flush with the closed end of the tapered recess to fasten the first component to the second component.

12. The connector system of claim 11 wherein the female profile comprises a routed recess in the second component.

13. The connector system of claim 11 wherein the female profile is formed on a connector member attachable to the second component.

14. The connector system of claim 11 wherein the male connector is detachable from the female connector following lateral movement toward the open end of the female profile.

15. The connector system of claim 11 wherein the body of the male connector is formed of a material less deformable that the second component.

16. The connector system of claim 11 wherein the body of the male connector has an inclined exterior surface between opposite sides conformable to an inclined interior surface between side walls of the converging recessed female profile when the male connector is fully inserted into the recessed female profile.

17. The connector system of claim 11 wherein the female profile has a depth greater at the closed end than at the open end.

* * * * *